United States Patent
Parashar et al.

(10) Patent No.: US 12,499,360 B2
(45) Date of Patent: Dec. 16, 2025

(54) METHODS AND SYSTEMS FOR MANAGING PROCESSING OF NEURAL NETWORK ACROSS HETEROGENEOUS PROCESSORS

(71) Applicant: SAMSUNG ELECTRONICS CO., LTD., Suwon-si (KR)

(72) Inventors: Akshay Parashar, Bengaluru (IN); Arun Abraham, Bengaluru (IN); Payal Anand, Bengaluru (IN); Deepthy Ravi, Bengaluru (IN); Venkappa Mala, Bengaluru (IN); Vikram Nelvoy Rajendiran, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1078 days.

(21) Appl. No.: 17/159,598

(22) Filed: Jan. 27, 2021

(65) Prior Publication Data
US 2021/0232921 A1    Jul. 29, 2021

(30) Foreign Application Priority Data

Jan. 27, 2020 (IN) .............................. 202041003492
Jan. 19, 2021 (IN) .............................. 202041003492

(51) Int. Cl.
    *G06N 3/08*      (2023.01)
    *G06F 9/30*      (2018.01)
     (Continued)

(52) U.S. Cl.
CPC .......... *G06N 3/08* (2013.01); *G06F 9/30025* (2013.01); *G06F 9/3885* (2013.01); *G06F 9/4843* (2013.01); *G06N 3/063* (2013.01)

(58) Field of Classification Search
CPC .......... G06N 3/08; G06N 3/063; G06N 3/045; G06F 9/30025; G06F 9/3885; G06F 9/4843; G06F 9/5027
See application file for complete search history.

(56) References Cited

U.S. PATENT DOCUMENTS

| 10,832,120 B2 | 11/2020 | Diamos et al. |
| 2017/0024849 A1 | 1/2017 | Liu et al. |

(Continued)

FOREIGN PATENT DOCUMENTS

WO      2018/184208 A1      10/2018

OTHER PUBLICATIONS

Akopyan et al., "TrueNorth: Design and Tool Flow of a 65 mW 1 Million Neuron Programmable Neurosynaptic Chip", IEEE. (Year: 2015).*

(Continued)

*Primary Examiner* — Ryan C Vaughn
(74) *Attorney, Agent, or Firm* — Sughrue Mion, PLLC

(57) ABSTRACT

A method, an apparatus, and a system for configuring a neural network across heterogeneous processors are provided. The method includes creating a unified neural network profile for the plurality of processors; receiving at least one request to perform at least one task using the neural network; determining a type of the requested at least one task as one of an asynchronous task and a synchronous task; and parallelizing processing of the neural network across the plurality of processors to perform the requested at least one task, based on the type of the requested at least one task and the created unified neural network profile.

14 Claims, 37 Drawing Sheets

(51) Int. Cl.
  *G06F 9/38* (2018.01)
  *G06F 9/48* (2006.01)
  *G06N 3/063* (2023.01)

(56) References Cited

U.S. PATENT DOCUMENTS

| | | | | |
|---|---|---|---|---|
| 2017/0308789 | A1* | 10/2017 | Langford | G06N 3/045 |
| 2018/0181809 | A1* | 6/2018 | Ranjan | G06V 10/245 |
| 2019/0236437 | A1 | 8/2019 | Shin et al. | |
| 2019/0266015 | A1* | 8/2019 | Chandra | G06F 9/505 |
| 2019/0324759 | A1 | 10/2019 | Yang et al. | |
| 2019/0340491 | A1 | 11/2019 | Norden et al. | |
| 2019/0347542 | A1 | 11/2019 | Chen et al. | |
| 2020/0019854 | A1 | 1/2020 | Abraham et al. | |

OTHER PUBLICATIONS

Dhakal et al., "NetML: An NFV Platform with Efficient Support for Machine Learning Applications", IEEE. (Year: 2019).*

Jiang et al., "Heterogeneous FPGA-Based Cost-Optimal Design for Timing-Constrained CNNs", IEEE. (Year: 2018).*
Li et al., "HPDL: Towards a General Framework for High-performance Distributed Deep Learning", IEEE. (Year: 2019).*
Wang et al., "An Asymmetric Data Conversion Scheme based on Binary Tags", IEEE. (Year: 2010).*
Communication dated Jan. 7, 2022 issued by the Indian Patent Office in counterpart Indian Application No. 202041003492.
Jilin Zhang et al., "A Parallel Strategy for Convolutional Neural Network Based on Heterogeneous Cluster for Mobile Information System", Hindawi, Mar. 21, 2017, vol. 2017, Article ID 3824765, pp. 1-12 (14 pages total).
Written Opinion (PCT/ISA/237) issued by the International Searching Authority in International Application No. PCT/KR2021/001017, issued on May 11, 2021.
International Search Report (PCT/ISA/210) issued by the International Searching Authority in International Application No. PCT/KR2021/001017, issued on May 11, 2021.
Yanping Huang et al., "GPipe: Efficient Training of Giant Neural Networks using Pipeline Parallelism", 33rd Conference on Neural Information Processing Systems, NeurIPS 2019, 2019, pp. 1-10, 10 pages total.

* cited by examiner

- Prior Art -

FIG. 6C

Layer 1
Type: Convolution,
'Convolution specific information',
Input: Input Image,
Output: Layer2,
'CPU specific info',
'GPU specific info',
'DSP specific info',
'NPU specific info',
'float32 weights data',
'int8 weights data'

Layer2
Type: Convolution,
'Convolution specific information',
Input: Layer1,
Output: Output Image,
'CPU specific info',
'GPU specific info',
'DSP specific info',
'NPU specific info',
'float32 weights data',
'int8 weights data'

Use underlined information for processing layers 1 and 2 on DSP

---

Layer 1
Type: Convolution,
'Convolution specific information',
Input: Input Image,
Output: Layer2,
'CPU specific info',
'GPU specific info',
'DSP specific info',
'NPU specific info',
'float32 weights data',
'int8 weights data'

Layer2
Type: Convolution,
'Convolution specific information',
Input: Layer1,
Output: Output Image,
'CPU specific info',
'GPU specific info',
'DSP specific info',
'NPU specific info',
'float32 weights data',
'int8 weights data'

Use underlined information w.r.t layer 1 for processing layer 1 on GPU and use underlined information w.r.t layer 2 for processing layer 2 on DSP

---

Layer 1
Type: Convolution,
'Convolution specific information',
Input: Input Image,
Output: Layer2,
'CPU specific info',
'GPU specific info',
'DSP specific info',
'NPU specific info',
'float32 weights data',
'int8 weights data'

Layer2
Type: Convolution,
'Convolution specific information',
Input: Layer1,
Output: Output Image,
'CPU specific info',
'GPU specific info',
'DSP specific info',
'NPU specific info',
'float32 weights data',
'int8 weights data'

Use underlined information w.r.t layer 1 for processing layer 1 on NPU and use underlined information w.r.t layer 2 for processing layer 2 on GPU

FIG. 11C

```
Frame 0:
time[CPU] = 100, time[GPU] = 50, time[DSP] = 30, time[NPU] = 20
processor_pipeline_time[CPU, GPU, DSP, NPU] = {0, 0, 0, 0}
processor_number = NPU // Min time is for NPU
process[0] = NPU
processor_pipeline_time[NPU] = 20
```

```
Frame 1:
time[CPU] = 100, time[GPU] = 50, time[DSP] = 30, time[NPU] = 20
processor_pipeline_time[CPU, GPU, DSP, NPU] = {0, 0, 0, 20}
processor_number = DSP // DSP (30) < NPU (20 + 20)
process[1] = DSP
processor_pipeline_time[DSP] = 30
```

```
Frame 2:
time[CPU] = 100, time[GPU] = 50, time[DSP] = 30, time[NPU] = 20
processor_pipeline_time[CPU, GPU, DSP, NPU] = {0, 0, 30, 20}
processor_number = NPU // NPU (20 + 20) < GPU (50) < DSP (30 + 30)
process[2] = NPU
processor_pipeline_time[NPU] = 40
```

```
Frame 3:
time[CPU] = 100, time[GPU] = 50, time[DSP] = 30, time[NPU] = 20
processor_pipeline_time[CPU, GPU, DSP, NPU] = {0, 0, 30, 40}
processor_number = GPU // GPU (50) < NPU (40 + 20) = DSP (30 + 30)
process[3] = GPU
processor_pipeline_time[GPU] = 50
```

```
Frame 4:
time[CPU] = 100, time[GPU] = 50, time[DSP] = 30, time[NPU] = 20
processor_pipeline_time[CPU, GPU, DSP, NPU] = {0, 50, 30, 40}
processor_number = DSP // NPU (40 + 20) = DSP (30 + 30) < GPU (50 + 50)
process[4] = NPU
processor_pipeline_time[NPU] = 60
```

```
Frame 5:
time[CPU] = 100, time[GPU] = 50, time[DSP] = 30, time[NPU] = 20
processor_pipeline_time[CPU, GPU, DSP, NPU] = {0, 50, 30, 60}
processor_number = DSP // DSP (30 + 30) < NPU (60 + 20) < GPU (50 + 50)
process[5] = DSP
processor_pipeline_time[DSP] = 60
```

FIG. 11D

```
Frame 6:
time[CPU] = 100, time[GPU] = 50, time[DSP] = 30, time[NPU] = 20
processor_pipeline_time[CPU, GPU, DSP, NPU] = {0, 50, 60, 60}
processor_number = NPU // NPU (60 + 20) < DSP (60 + 30) < GPU (50 + 50)
process[6] = NPU
processor_pipeline_time[NPU] = 80

Frame 7:
time[CPU] = 100, time[GPU] = 50, time[DSP] = 30, time[NPU] = 20
processor_pipeline_time[CPU, GPU, DSP, NPU] = {0, 50, 60, 80}
processor_number = DSP // DSP (60 + 30) < NPU (80 + 20) < GPU (50 + 50)
process[7] = DSP
processor_pipeline_time[NPU] = 90

TOTAL_INFERENCE_TIME = MAX element in processor_pipeline_time array
```

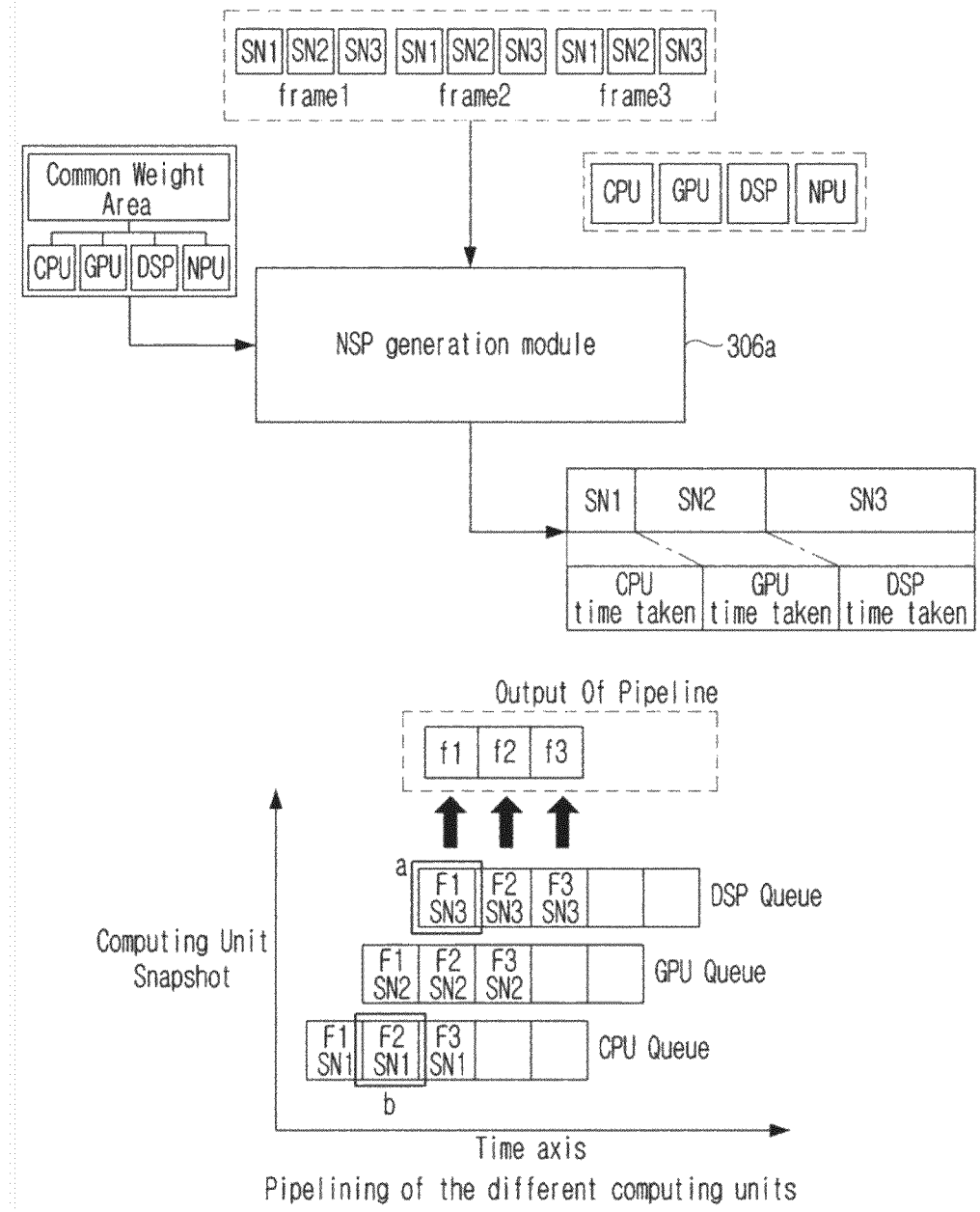

METHODS AND SYSTEMS FOR MANAGING PROCESSING OF NEURAL NETWORK ACROSS HETEROGENEOUS PROCESSORS

CROSS-REFERENCE TO RELATED APPLICATION(S)

This application is based on and claims priority under 35 U.S.C. § 119(a) to Indian Provisional Patent Application 202041003492 filed on Jan. 27, 2020 and Indian Complete Patent Application 202041003492 filed on Jan. 19, 2021, in the Indian Intellectual Property Office, the disclosures of which are incorporated by reference herein in their entireties.

BACKGROUND

1. Field

The present disclosure relates to configuring neural networks and more particularly to configuring neural networks across heterogeneous processors.

2. Description of Related Art

In general, an electronic device may implement one or more applications within a neural network to perform one or more tasks such as, but not limited to, image processing, image classification, object detection, instance segmentation, and so on. The neural network includes a plurality of layers for performing the one or more tasks.

In conventional methods, the electronic device pre-defines one or more processors to process the neural network for the one or more tasks, as the neural network is framework dependent. Examples of the one or more processors include, but are not limited to, a Central Processing Unit (CPU), a Graphics Processing Unit (GPU), a Digital Signal Processor (DSP), and so on. The electronic device complies information of the one or more layers of the corresponding neural network on the pre-defined one or more processors separately for the one or more tasks.

Further, upon or after receiving a request from a user to perform the task on one more or inputs, the electronic device processes the one or more layers of the neural network sequentially on the pre-defined one or more processors (which have been complied with the information of the one or more layers of the neural network for the requested task) for each of the received inputs. However, the electronic device may not be able to process the one or more layers of the neural network on other processors, which have not been complied with the information of the one or more layers of the neural network for the requested task. Further, the information of the one or more layers of the neural network compiled on one processor for the specific task may not be used for the other processors, on which the information about the one or more layers of the neural network is compiled for the other tasks.

Thus, the conventional methods involve sequential processing of the one or more layers of the neural network, which can lead to overutilization of the selected/pre-defined processors and under-utilization of unused processors for processing the neural network for the specific task.

Consider an example scenario as depicted in FIG. 1, wherein an electronic device includes a Central Processing Unit (CPU), a Graphics Processing Unit (GPU), a Digital Signal Processor (DSP), and a Neural Processing Unit (NPU). The NPU may be also referred to as a neural processor, a deep learning processor, or an artificial intelligence (AI) accelerator. In such a scenario, the electronic device pre-defines the DSP and the NPU for an example task of object classification. The electronic device pre-defines the NPU for an example task of object detection. The electronic device creates a pre-compiled model for the NPU using layers of a neural network defined for the object classification and the object detection, when the electronic device configures or forms the neural network on the NPU to perform the object classification and the object detection. Similarly, the electronic device creates a pre-compiled model for the DSP using the layers of the neural network defined for the object classification, when the electronic device configures or forms the neural network on the DSP for performing the object classification. The electronic device further compiles the respective pre-complied models on the NPU and the DSP separately for configuring the neural network.

Upon or after receiving a request to perform the object classification on one or more inputs, the electronic device enables the DSP and the NPU to process the one or more layers of the neural network defined for the object classification in the pre-defined order for each of the inputs using the pre-compiled models. Similarly, upon or after receiving a request to perform the object detection on one or more inputs, the electronic device enables the NPU to process the one or more layers of the neural network defined for the object detection in the pre-defined order for each of the inputs using the pre-compiled model. However, the electronic device may not be able to process the one or more layers of the neural network on the processors other than the pre-defined processors such as the GPU, the CPU, or the like for the object classification/detection, even though the other processors are free or idle.

Consider another example scenario, wherein the electronic device defines the NPU for an example task of applying a visual effect to video frames. The electronic device compiles the information of the one or more layers of the neural network on the NPU for applying the effect on the video frames. Upon or after receiving a request to apply the visual effect to input video frames, the electronic device enables the NPU to form the one or more layers of the neural network in the pre-defined order for each of the received input video frames and to generate output video frames corresponding to the received input video frames. The output video frames may include the requested visual effect. The output video frames may be combined to form a video output. Thus, the conventional method involves sequential processing of the layers of the neural network for each input video frame to perform the requested task on the pre-defined processor.

SUMMARY

One or more example embodiments provide methods and systems for configuring a neural network across heterogeneous processors.

Further, one or more example embodiments provide and systems for creating a unified neural network for all processors of an electronic device, wherein a universal profile of the unified neural network includes individual profiles of all the processors present in the electronic device with respect to metadata of the neural network.

Still further, one or more example embodiments provide methods and systems for receiving a request for performing at least one task on at least one input using the neural network and parallelizing processing of the neural network across the processors to perform the requested at least one task, based on a type of the requested task and the unified neural network profile.

According to an aspect of the present disclosure, there is provided a method for configuring a neural network across a plurality of processors, including: creating a unified neural network profile for the plurality of processors; receiving at least one request to perform at least one task using the neural network; determining a type of the requested at least one task as one of an asynchronous task and a synchronous task; and parallelizing processing of the neural network across the plurality of processors to perform the requested at least one task, based on the type of the requested at least one task and the created unified neural network profile.

The creating the unified neural network profile may include: extracting metadata of the neural network, wherein the metadata of the neural network indicates a number of layers for the at least one task and parameters of the layers, wherein the layers may include a first layer, and the parameters of the first layer may include at least one of, a type of the first layer, weights of the first layer, a data type supported for processing the weights of the first layer, and inputs and outputs of the first layer; determining individual profiles of the plurality of processors, wherein the plurality of processors may include a first processor, the individual profiles of the plurality of processors may include a first profile of the first processor, the first profile of the first processor may include the data type supported by the first processor, time required by the first processor to process each layer of the neural network, and overheads comprising either one or both of a data type conversion overhead and a data copy overhead; and creating a data set as the unified neural network profile by mapping the individual profiles of the plurality of processors with the layers of neural network and the parameters of the layers.

The data type may correspond to one of an integer data type, and a float data type; the data type conversion overhead may include time required for a conversion of the data type of at least one output of the first processor into a data type supported by a second processor of the plurality of processors, wherein the at least one output of the first processor may be provided to the second processor; and the data copy overhead may include time required for copying the at least one output of the first processor on the second processor.

The determining the type of the requested at least one task may include: determining whether an output order of at least output to be generated based on at least one input of the requested at least one task depends on an input order of the at least one input; determining that the requested at least one task is the asynchronous task, based on the output order not depending on the input order; and determining that the requested at least one task is the synchronous task, based on the output order depending on the input order.

The parallelizing the processing of the neural network across the plurality of processors may include one of: configuring the neural network across the plurality of processors for each of at least one input in parallel, based on the requested at least one task corresponding to the asynchronous task; and configuring the neural network across the plurality of processors for the at least one input in a pipelining structure, based on the requested at least one task corresponding to the synchronous task.

The configuring the neural network across the plurality of processors for each of the at least one input in parallel may include: determining parameters of each processor of the plurality of processors at a current instance of time, wherein the parameters of each processor comprise at least one of load on each processor, resources available on each processor, and a busy status of each processor; extracting an individual profile of each processor with respect to metadata of the neural network for the requested at least one task from the unified neural network profile; allocating at least one processor, among the plurality of processors, for the at least one input based on the determined parameters of each processor, and the individual profile of each processor with respect to the metadata of the neural network for the requested at least one task; providing the unified neural network profile and the at least one input to the allocated at least one processor; and configuring the neural network on the allocated at least one processor in parallel for each of the at least one input.

The same at least one processor may be allocated for each of the at least one input, and at least one different processor is allocated for each of the at least one input.

The configuring the neural network across the plurality of processors for the at least one input in the pipelining structure may include: generating a plurality of combinations of subnetworks (subnets) from the neural network, wherein each of the plurality of combinations of subnets comprises a plurality of subnets; selecting a combination of subnets from the plurality of subnets; allocating different processors, among the plurality of processors, for the plurality of subnets in the selected combination of subnets; and configuring the plurality of subnets of the selected combination of subnets on the allocated different processors in parallel for each of the at least one input.

The generating the plurality of combinations of subnets may include: performing a topological sort on the neural network; performing a layer-wise profiling of the neural network with respect to the plurality of processors; and generating the plurality of combinations of subnets based on the performed topological sort and the layer-wise profiling of the neural network, wherein the plurality of subnets of each of the plurality of combinations of subnets is generated using a plurality of split points.

The performing the topological sort may include analyzing a topology of the neural network to determine whether layers of the neural network that are connected in series or in parallel.

The performing the layer-wise profiling may include: identifying individual profiles of the plurality of processors mapped with respect to layers of the neural network and associated parameters of the layers, from the unified neural network profile; and determining time required by the plurality of processors to process the layers of the neural network using the identified individual profiles of the plurality of processors.

The plurality of split points may be points in the neural network, where the neural network may be divided into the plurality of combinations of subnets, wherein the subnets may correspond to the layers of the neural network.

The selecting the combination of subnets from the plurality of subnets may include: assigning the different processors for processing the plurality of subnets of each of the plurality of combinations of subnets, based on layer-wise profiling of the neural network; recording processing times consumed by the different processors for processing the plurality of subnets of each of the plurality of combinations of subnets; recording a data copy overhead incurred for each of the plurality of combinations of subnets; calculating a splitting cost of a plurality of split points associated with each of the plurality of combinations of subnets based on the recorded processing time and the recorded data copy overhead, wherein the splitting cost is a measure of difference between the processing times and the data copy overhead; determining, among the plurality of split points, a combination of split points that is associated with a minimal splitting cost compared to other split points of the plurality of split points; and selecting the combination of subnets from the plurality of combinations of subnets associated with the determined combination of split points.

Among the plurality of processors, a fastest and available processor of the plurality of processors may be assigned to a subnet of the plurality of subnets that has a greatest number of layers compared to other subnets, and a slowest processor of the plurality of processors may be assigned to another subnet of the plurality of subnets that has a least number of layers compared to other subnets.

According to an aspect of the present disclosure, there is provided a method for configuring a neural network across a plurality of processors, including: obtaining individual profiles of the plurality of processors; creating a unified neural network profile comprising information of the individual profiles of the plurality of processors; identifying information of a task implemented within the neural network; and parallelizing the task according to the identified information.

The method may further include: assigning the parallelized task to the plurality of processors in an initialization phase of the task.

The individual profiles may include a first profile of a first processor of the plurality of processor, and the first profile may include at least one of a data type that is processed by the first processor, and time required for the first processor to process each layer of the neural network.

The information of the task may indicate that the task is an asynchronous task or a synchronous task, wherein the asynchronous task may involve generation of outputs in an order of inputs, wherein the synchronous task may involve generation of the outputs independent of the order of the inputs.

The parallelizing of the task may include: parallelizing the inputs received to perform the task among the plurality of processors based on the task corresponding to the asynchronous task.

The parallelizing of the task may include: dividing the neural network into subnetworks (subnets) to match a number of the plurality of processors; and parallelizing the subnets into a pipelining structure to generate outputs in an order of inputs.

The assigning the parallelized task to the plurality of processors may include one of: upon receiving inputs of the task, allocating the plurality of processors for the inputs or subnetworks of the neural network based on the unified neural network profile and parameters of the plurality of processors at a current instance of time, wherein the parameters of the plurality of processors may include either one or both of load on the plurality of processors), and resources available on the plurality of processors; and configuring the neural network on the plurality of processors allocated for the inputs or the subnetworks, in parallel.

According to an aspect of the present disclosure, there is provided an electronic device including: a memory; a plurality of processors; and a controller coupled to the plurality of processors and the memory, and configured to: create a unified neural network profile for the plurality of processors; receive at least one request to perform at least one task using a neural network; determine a type of the requested at least one task as one of an asynchronous task and a synchronous task; and configuring the neural network across the plurality of processors in parallel to perform the requested at least one task, based on the type of the requested at least one task and the created unified neural network profile.

The controller may be further configured to: extract metadata of the neural network, wherein the metadata of the neural network may indicate a number of layers for the at least one task and parameters of the layers, wherein the layers may include a first layer, and the parameters of the first layer comprise at least one of, a type of the first layer, weights of the first layer, a data type supported for processing the weights of the first layer, and inputs and outputs of the first layer; determine individual profiles of the plurality of processors, wherein the plurality of processors may include a first processor, the individual profiles of the plurality of processors comprises a first profile of the first processor, the first profile of the first processor may include the data type supported by the first processor, time required by the first processor to process each layer of the neural network, and overheads including at least one of a data type conversion overhead and a data copy overhead; and create a data set, the unified neural network profile, by mapping the individual profiles of the plurality of processors with the layers of neural network and the parameters of the layers.

The data type may correspond to one of an integer data type, and a float data type; the data type conversion overhead may include time required for a conversion of the data type of at least one output of the first processor into a data type supported by a second processor of the plurality of processors, wherein the at least one output of the first processor may be provided to the second processor; and the data copy overhead may include time required for copying the output of the first processor on the second processor.

The controller may be further configured to: determine whether an output order of at least output to be generated based on at least one input of the requested at least one task depends on an input order of the at least one input; determine that the requested at least one task is the asynchronous task, based on the output order not depending on the input order; and determine that the requested at least one task is the synchronous task, based on the output order depending on the input order.

The controller may be further configured to: configure the neural network across the plurality of processors for each of at least one input in parallel, based on the requested at least one task corresponding to the asynchronous task; and configure the neural network across the plurality of processors for the at least one input in a pipelining structure, based on the requested at least one task corresponding to the synchronous task.

The controller may be further configured to: determine parameters of each processor of the plurality of processors at a current instance of time, wherein the parameters of each processor comprise at least one of load on each processor, resources available on each processor, and a busy status of each processor; extract an individual profile of each processor with respect to metadata of the neural network for the requested at least one task from the unified neural network profile; allocate at least one processor, among the plurality of processors, for the at least one input based on the determined parameters of each processor, and the individual profile of each processor with respect to the metadata of the neural network for the requested at least one task; provide the unified neural network profile and the at least one input to the allocated at least one processor; and configuring the neural network on the allocated at least one processor in parallel for each of the at least one input.

The same at least one processor may be allocated for each of the at least one input, and at least one different processor may be allocated for each of the at least one input.

The controller may be further configured to configure the neural network across the plurality of processors for the at least one input in the pipelining structure by: generating a plurality of combinations of subnetworks (subnets) from the neural network, wherein each of the plurality of combinations of subnets comprises a plurality of subnets; selecting a combination of subnets from the plurality of subnets; allocating different processors, among the plurality of processors, for the plurality of subnets in the selected combination of subnets; and configuring the plurality of subnets of the selected combination of subnets on the allocated different processors in parallel for each of the at least one input.

The controller may be further configured to: perform a topological sort on the neural network; perform a layer-wise profiling of the neural network with respect to the plurality of processors; and generate the plurality of combinations of subnets based on the performed topological sort and the layer-wise profiling of the neural network, wherein the plurality of subnets of each of the plurality of combinations of subnets is generated using a plurality of split points.

The controller may be further configured to perform the topological sort by analyzing a topology of the neural network to determine whether layers of the neural network that are connected in series or in parallel.

The controller may be further configured to perform the layer-wise profiling by: identifying individual profiles of the plurality of processors mapped with respect to the layers of the neural network and parameters of the layers, from the unified neural network profile; and determining time required by the plurality of processors to process the layers of the neural network using the identified individual profiles of the plurality of processors.

The plurality of split points may be points in the neural network, where the neural network may be divided into the plurality of combinations of subnets, wherein the subnets may correspond the layers of the neural network.

The controller may be further configured to: assign the different processors for processing the plurality of subnets of each of the plurality of combinations of subnets, based on layer-wise profiling of the neural network; record processing times consumed by the different processors for processing the plurality of subnets of each of the plurality of combinations of subnets; record the data copy overhead incurred for each of the plurality of combinations of subnets; calculate a splitting cost of a plurality of split points associated with each of the plurality of combinations of subnets based on the recorded processing time and the recorded data copy overhead, wherein the splitting cost is a measure of difference between the processing times and the data copy overhead; determine, among the plurality of split points, a combination of split points that is associated with a minimal splitting cost compared to other split points of the plurality of split points; and select the combination of subnets from the plurality of combinations of subnets associated with the determined combination of split points.

Among the plurality of processors, a fastest and available processor of the plurality of processors may be assigned to a subnet of the plurality of subnets that has a greatest number of layers compared to other subnets, and a slowest processor may be assigned to another subnet of the plurality of subnets that has a least number of layers compared to other subnets.

BRIEF DESCRIPTION OF THE DRAWINGS

The above and/or other aspects will be more apparent by describing certain example embodiments, with reference to the accompanying drawings, in which:

FIGS. 6A, 6B, and 6C are example diagrams depicting generation and utilization of the unified neural network profile for processing the neural network across the processors, according to embodiments as disclosed herein;

FIGS. 11C and 11D are example diagrams depicting allocation of the processors for one or more input frames to perform the asynchronous task, according to embodiments as disclosed herein;

FIGS. 16A and 16B are example diagrams depicting pipelining processing of the subnets of the neural network to perform the synchronous task on the received one or more inputs, according to embodiments as disclosed herein;

DETAILED DESCRIPTION

Figure 1:
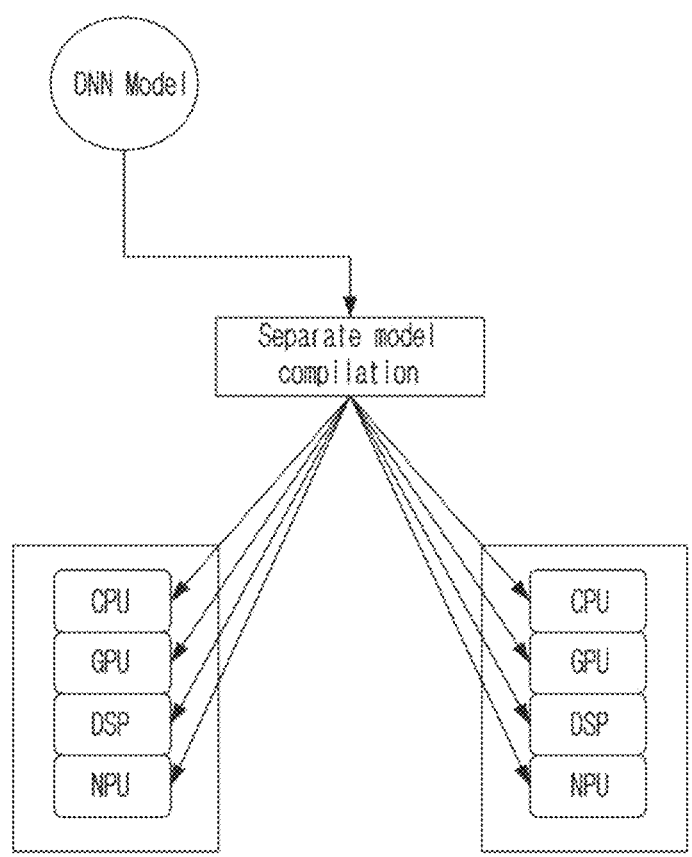
FIG. 1 depicts an example conventional method of processing a neural network to perform at least one task.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail Embodiments herein disclose methods and systems for configuring a neural network across heterogeneous processors.

In the present disclosure, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 2:
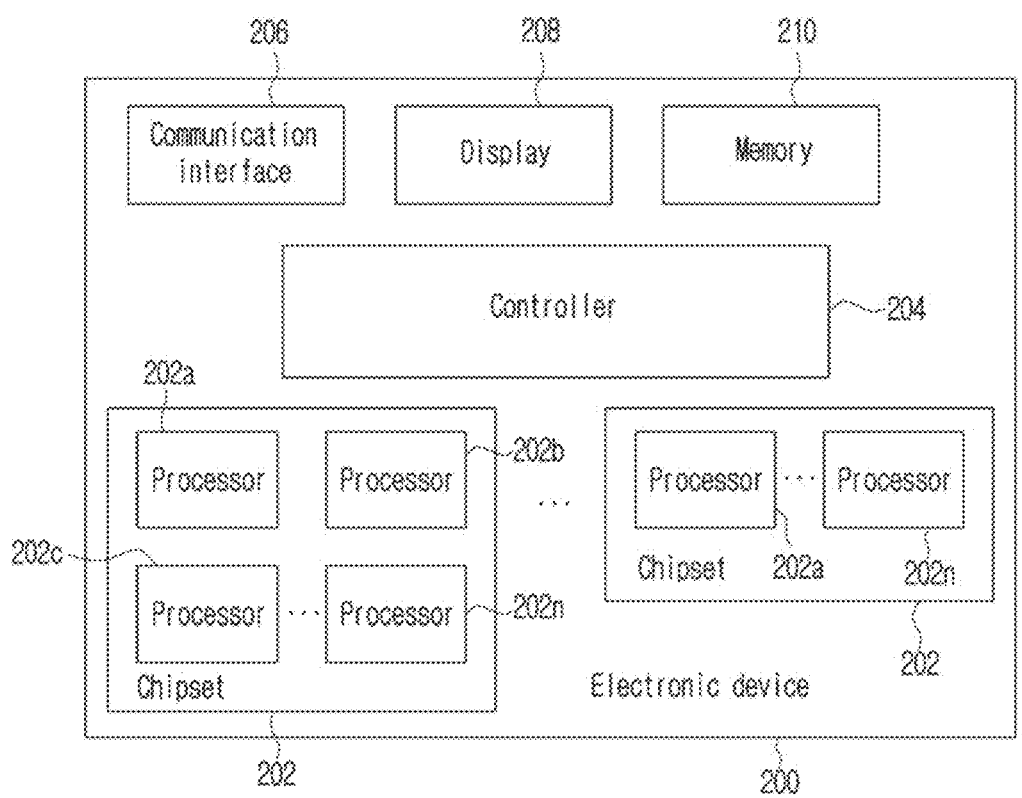
FIG. 2 depicts an electronic device, according to embodiments as disclosed herein.

FIG. 2 depicts an electronic device 200, according to embodiments as disclosed herein. The electronic device 200 referred herein may be any user device that is capable of using one or more neural networks to perform one or more tasks.

Examples of the electronic device 200 may include, but is not limited to, a mobile phone, a smartphone, tablet, a phablet, a personal digital assistant (PDA), a laptop, a wearable device, a hand-held device, an Internet of Things (IoT) device, a vehicle infotainment system, a medical device, a game console, a digital camera, or any other device that can process the neural network(s). The electronic device 200 may also be a special-purpose computing system such as, but is not limited to, a server, a cloud, a multiprocessor system, a microprocessor based programmable consumer electronics, a network computer, a minicomputer, a mainframe computer, and so on.

The one or more tasks referred herein may include at least one of, but is not limited to, a processing of media, an object classification, an object detection, controlling display screen settings, and so on. Examples of the media may include, but is not limited to, an audio, an image, a video, a Graphics Interchange Format (GIF), and so on. In an example, the processing of the media involves at least one of, but not limited to, media improvement, media restoration, applying at least one of filters, effects, styles, or the like on the media, tuning the media, super resolution, in painting and so on.

Examples of the neural network referred herein may include, but is not limited to, a deep neural network (DNN), a convolutional neural network (CNN), a recurrent neural network (RNN), a restricted Boltzmann Machine (RBM), a deep belief network (DBN), a bidirectional recurrent deep neural network (BRDNN), generative adversarial networks (GAN), a deep Q-network, and so on. The neural network includes a plurality of layers connected with each other. In an example, the layers may be connected with each other in series (sequential connection). In an example, the layers may be connected with each other in parallel (branched modules/branched connections). Each layer has a plurality of weight values and performs a layer operation through calculation of a previous layer and an operation of the plurality of weights. Examples of the layers may include, but is not limited to, a convolutional layer, an activation layer, an average pool layer, a max pool layer, a concatenated layer, a dropout layer, a fully connected layer, a SoftMax layer, and so on.

A topology of the layers of the neural network may vary based on a type of the neural network. In an example, the neural network may include an input layer, an output layer, and a hidden layer. The input layer receives an input (for example herein, an image, a video, an audio, or the like) and forwards the received input to the hidden layer. The hidden layer transforms the input received from the input layer into a representation, which may be used for generating the output in the output layer. The hidden layer transforms the received input layer into the representation by extracting useful/low level features from the input, introducing non-linearity in the neural network and reducing a feature dimension to make the features equivariant to scale and translation. Each layer may include one or more nodes. The nodes of the layers may be fully connected via edges to the nodes in adjacent layers. The input received at the nodes of the input layer may be propagated to the nodes of the output layer via an activation function that calculates the states of the nodes of each successive layer in the network based on the coefficients/weights respectively associated with each of the edges connecting the layers.

The electronic device 200 further includes one or more applications related to the one or more tasks, which may be implemented within or by using the neural network. The one or more applications implemented in the neural network may receive one or more inputs on which the one or more tasks may be performed. Examples of the applications may include, but not limited to, a camera application, a gallery application, a media processing application, a display application, and so on. Examples of the inputs may include, but not limited to, images, video frames, GIF, text, audio, display screen settings, and so on.

In an embodiment, the electronic device 200 may communicate with at least one external entity (e.g., an external device) using a communication network for accessing the neural network. Examples of the external entity may include, but is not limited to, an external server, an external database, a cloud (e.g., a cloud network or a cloud networking system), and so on. Examples of the communication network may include, but is not limited to, the Internet, a wired network (a Local Area Network (LAN), Ethernet and so on), a wireless network (a Wi-Fi network, a cellular network, a Wi-Fi Hotspot, Bluetooth, Zigbee and so on), and so on.

The accessed neural network may be a trained neural network in which a number of layers, a sequence for processing the layers and parameters related to each layer may be known and fixed for each of the one or more tasks. Examples of the parameters may include, but not limited to, activation functions, biases, input weights, output weights, and so on, related to the layers of the neural network.

In an embodiment, the electronic device 200 may communicate with the at least one external entity to access training information. Examples of the training information may include, but not limited to, processed media, media with the annotated/detected objects, media with the classified objects, and so on. The electronic device 200 may train the neural network using the received training information.

Thus, the neural network used through the document may be the trained neural network.

The electronic device 200 includes one or more chipsets 202, a controller 204, a communication interface 206, a display 208, and a memory 210. The electronic device 200 also includes a transceiver, a processing circuitry associated with the transceiver, an Input/Output (I/O) module, communication ports, and so on.

The chipset 202 may be an integrated circuit including a plurality of processors/computing units 202a-202n. In an embodiment, the plurality of processors 202a-202n may be heterogeneous processors. Examples of the processors 202a-202n may include, but is not limited to, a Central Processing Unit (CPU), a Graphics Processing Unit (GPU), a Digital Signal Processor (DSP), a Neural Processing Unit (NPU), an Image Signal Processor (ISP), an accelerator, or any hardware capable of processing the neural network. The processors 202a-202n may configure (or process, or execute) the neural network for performing the one or more tasks based on the one or more inputs. Configuring, processing, and/or executing the neural network to perform the one or more tasks involves configuring the layers of the neural network for each of the one or more inputs and generating the one or more outputs corresponding to the one or more inputs.

The controller 204 may configure, form, process, and/or execute the neural network across the heterogeneous processors 202a-202n to perform the one or more tasks based on the one or more inputs. In an embodiment, the controller 204 may be, but is not limited to, a single processer, a plurality of processors, multiple homogenous cores, multiple heterogeneous cores, multiple CPUs of different kinds, and so on. In an embodiment, the controller 204 may be one of the processors 202a-202n of the one or more chipsets 202.

For configuring or executing the neural network across the one or more processors 202a-202n, the controller 204 generates a unified neural network profile for all the processors 202a-202n of the one or more chipsets 202 in an initialization phase. The initialization phase corresponds to a phase, wherein the one or more applications related to the one or more tasks may be initialized within the neural network (i.e., prior to initiating configuration of the neural network for the one or more tasks).

For generating the unified neural network profile, the controller 204 extracts metadata from the neural network (i.e., the neural network received from the external entity or the neural network trained using the received training information). Examples of the metadata may include, but not limited to, a number of layers of the neural network defined for each task, a sequence for processing the layers of the neural network for each task, data flow and/or connection between the layers (i.e., at least one input and at least one output of each layer), weights, biases, and/or activation functions associated with each layer of the neural network, data types supported by the weights of the layers of the neural network, and so on. Examples of the data types may include, but is not limited to, an integer type (int), a float type, and so on.

The controller 204 also fetches specification and/or information about the processors 202a-202n stored in the memory 210. Examples of the information about the processors 202a-202n may include, but not limited to the data types supported by each processor, resources allocated for each processor, or the like. For example, a processor 1 may support a 32 bit floating data type and a processor 2 may support an 8-bit integer data type. Therefore, the unified neural network profile includes a copy of all the data types needed by the set of available processors 202a-202n. In an example herein, the resources may include resources required for processing the layers of the neural network such as, but not limited to, kernels required for the processor (for example: the GPU processor) for processing the neural network, and so on. The controller 204 further determines time required by each processor 202a-202n to process each layer of the neural network, overheads, and so on. Examples of the overheads may include, but is not limited to, a data type conversion overhead, a data transfer/copy overhead, and so on. The data type conversion overhead may be referred to a conversion of a data type of an output of the processor 202a-202n. For example, consider that a processor 1 and a processor 2 have been allocated for processing the neural network, wherein the processor 1 supports a float data type and the processor 2 supports an int data type. Further, an output of the processor 1 has to be provided to the processor 2. In such a scenario, the output of the processor 1 (i.e., the float data type) has to be converted to the int data type for the processor 2. Such a type of data conversion may be referred as the data type conversion overhead. The data copy overhead may include copying of the data of the neural network between the processors 202a-202n during the processing of the neural network. For example, the data copy overhead involves copying processing output of a layer of the neural network to another layer of the neural network.

The controller 204 creates the unified neural network by including the metadata of the neural network, and profiles of each processor 202a-202n. In an embodiment, the profiles of each processor 202a-202n may include, but not limited to, the data types supported by each processor 202a-202n, the resources allocated for each processor 202a-202n, the time required by each processor 202a-202n to process each layer of the neural network, the overheads, and so on. The controller 204 stores the created unified neural network profile in the memory 210.

The controller 204 initiates processing of the neural network across the processors 202a-202n, on receiving a request to perform the task(s) on the received one or more inputs. In an example, the controller 204 may receive the request to perform the task on the one or more inputs from the user of the electronic device 200. In an example, the controller 204 may receive the request to perform the task on the one or more inputs from the one or more applications being executing on the electronic device 200. In an example, the controller 204 may receive the request to perform the task on the one or more inputs from the external entity. Examples of the one or more inputs may include, but not limited to, audio, image frames, videos, GIFs, text, and so on. The one or more inputs and the one or more tasks may be related to the one or more applications implemented within the neural network. In an example, the one or more inputs may be stored in the memory 210. In an example, the one or more inputs may be real time inputs. The real time inputs may be, but not limited to, the inputs being captured by the electronic device 200 using the one or more applications implemented within the neural network, the inputs being fetched from the external entity, the inputs being displayed/rendered on the electronic device 200, and so on.

Upon or after receiving the request to perform the task on the one or more inputs, the controller 204 classifies the requested task into a synchronous task, or an asynchronous task by checking a type of the one or more inputs. The controller 204 checks if an order of the one or more outputs (that have to be generated for the received one or more inputs) depends on an order of the received one or more inputs for the requested task. If the order of the one or more outputs depends on the order of the received one or more inputs for the requested task, the controller 204 classifies the requested task into the synchronous task. Examples of the synchronous task may be, but is not limited to, media processing, super resolution of the media, night mode task (for example: adjusting the display screen settings), or the like. The synchronous task includes the real time inputs. If the order of the one or more outputs does not depend on the order of the received one or more inputs for the requested task, the controller 204 classifies the requested task into the asynchronous task. Examples of the asynchronous task may include, but is not limited to, media processing on the stored media (for example: applying a style on the stored media, a filter on the stored, or the like), an object detection, an object classification, and so on.

Upon or after classifying the requested task into the asynchronous task or the synchronous task, the controller 204 determines a type of processing or configuring of the neural network for performing the requested task on the received one or more inputs. The type of processing includes a parallel processing and a pipelining processing. The controller 204 determines the parallel processing of the neural network for the asynchronous task. The controller 204 determines the pipelining processing of the neural network for the synchronous task.

For the parallel processing of the neural network, the controller 204 determines parameters of the processors 202a-202n at a current instance of time. Examples of the parameters of the processor 202a-202n may include, but is not limited to, load present on each processor 202a-202n, the resources available for each processor 202a-202n to process the neural network, a speed of the processor 202a-202n, a busy status of the processor 202a (that is if the processor 202a-202n is busy or free), and so on. The load present on the processor 202a-202n may depict the tasks that have been pending for processing using the neural network. The resources may be kernels required for processing the neural network. The speed of the processor 202a-202n may be depicted from time required by the processor 202a-202n to configure, execute, or process the neural network. The busy status of the processor 202a-202n indicates whether the processor is being processing any tasks using the neural network, at a current instance of time. The controller 204 further fetches the unified neural network profile from the memory 210 and identifies the metadata of the neural network and the profiles of each processor 202a-202n for the requested task. Based on the metadata of the neural network for the requested task, the profiles of each processor 202a-202n for the requested task and the current parameters of each processor 202a-202n, the controller 204 allocates or divides the received one or more inputs to the one or more processors 202a-202n. In an example, the two or more inputs may be allocated to the same processor 202a. In an example, the one or more inputs may be allocated to the one or more different processors 202a-202n. The controller 204 enables the one or more processors 202a-202n to process the layers of the neural network defined for the requested task for the allocated one or more inputs in parallel. The allocated processor 202a-202n may process the layers of the neural network defined for the requested task in the pre-defined sequence for the allocated one or more inputs and generate the one or more outputs corresponding to the one or more inputs. Processing or configuring the layer of the neural network defined for the requested task for the one or more inputs refers to performing the requested task on the one or more inputs.

Consider an example scenario, wherein the controller 204 receives a request to perform the asynchronous task on 4 input video frames. Further, the electronic device 200 includes three processors 202a-202n (a processor 1, a processor 2, and a processor 3). In such a scenario, the controller 204 divides the received four (4) input video frames across the three processors 202a-202n based on the unified neural network profile, and the current parameters of the processors 202a-202n. Examples of the current parameters of the processors 202a-202n may be, but not limited to, processing speed, processor load, busy status, and so on of each processor 202a-202n. In an example, the controller 204 selects a fastest processor (i.e., the processing speed of the processor is higher than the other processors) over a slowest processor (i.e., the processing speed of the processor is lower than the other processors), as the fastest processor may perform processing of the neural network faster and may become free than slower one. In an example, the controller 204 may select a next preference free processor, if the fastest processor is busy or assigned with some other task (may or may not be for processing the neural network). In this example scenario, consider that the processor 1 may be the fastest processor and the processor 3 may be the slowest processor and the processor 1 is free. Therefore, the controller 204 may allocate two inputs to the processor 1, one input to the processor 2 and the processor 3. The controller 204 enables the processors 1-3 to process the allocated inputs in parallel to perform the requested task.

For the pipelining processing of the neural network, the controller 204 splits the neural network into subnetworks (subnets). The subnets may include a set of layers of the neural network. The layers may include the layers connected in series and/or the layers connected in parallel. For splitting the neural network into the subnets, the controller 204 performs a pre-processing step. In the pre-processing step, the controller 204 performs a topological sort on the neural network. The topological sort includes analyzes the topology of the neural network to determine the layers of the neural network that are connected in series (the series connections) and the layers of the neural network that are connected in parallel (the branched connections). The controller 204 also performs a layer-wise profiling by fetching the profiles of the available processors 202a-202n with respect to the metadata of the neural network from the unified neural network profile and determines at least one of, the time required by each processor to process the layers of the neural network, the data copy overhead, and so on.

Upon or after performing the pre-processing step, the controller 204 divides the neural network into a plurality of combinations of the subnets. Each subnet of each combination may include split points, wherein each split point may correspond to a point in the neural network, where the neural network is divided into the subnets. Each split point may correspond to the layer of the neural network. The layer of the neural network corresponding to the split point may include the layer connected in the series and the layer connected in the branched module. On splitting the neural network into the plurality of combinations of the subnets, the controller 204 selects the processors 202a for the subnets of each combination based on the topological sort and the layer-wise profiling performed in the pre-processing step. The controller 204 enables the selected processors 202a to process/execute the respective subnets and records the time taken by the processors 202a to process the subnets of each combination. The controller 204 also records the data copy overhead associated with each combination of the subnets. On recording the time required to process the subnets of each combination and the data overhead, the controller 204 calculates a splitting cost of each splitting point of each subnet of each combination. The splitting cost may be a measure of difference between processing times of the plurality of subnets of each combination and the data overhead associated with each combination of the subnets. The splitting cost may be calculated based on at least one of, but not limited to, time recorded to process each subnet, the data copy overhead, and so on. The controller 204 selects the split points based on the splitting cost calculated for each splitting point. The selected split points may correspond to the split points with minimal splitting cost compared to the other split points. The controller 204 divides the neural network into the subnets with the selected split points or selects the combination of the subnets from the plurality of combinations of subnets associated with the split points of the minimal splitting cost. The controller 204 allocates the processors 202a-202n for the subnets based on the profiles of the processors 202a-202n and the current parameters of the processors 202a-202n. The controller 204 loads the subnets on the respective allocated processors 202a-202n to process the subnets. The controller 204 enables the allocated processors 202a-202n to process the respective subnets in a pipelining method/manner for each of the received input. The pipelining method involves the parallel processing of the subnets on the different allocated processors 202a-202n.

Consider an example scenario, wherein the controller 204 generates three combinations of the subnets (a combination 1, a combination 2, and a combination 3). The controller 204 calculates the splitting cost associated with the split points of the subnets in each of the three combinations. The controller 204 calculates the splitting cost based on at least one of, but not limited to, the time required by the processor to process the subnets, the data copy overhead (copying processing output of one subnet on another subnet), and so on. In an example herein, the controller 204 selects the split points of the subnets of the combination 3, as the splits points may be associated with the minimal splitting cost compared to the other split points of the subnets of the other combinations. The controller 204 divides the neural network into the subnets (for example: two subnets, a subnet 1 and a subnet 2), based on the selected split points (i.e., the split points of the subnets of the combination 3) or selects the subnets of the combination 3 (that includes the subnet 1 and the subnet 2). The controller 204 allocates the processors (a processor 1 and a processor 2) for the subnet 1 and the subnet 2, based on the profile of the processors 202a-202n and the current parameters of the processors 202a-202n (for example, load, processing speed, available resources, or the like), and so on. The controller 204 enables the processor 1 and the processor 2 to process the subnet 1 and the subnet 2 respectively, in the pipelining method for each of the received input.

The communication interface 206 may be configured to enable the electronic device 200 to communicate with the at least one external entity using the communication network.

The display 208 may be configured to enable the user to interact with the electronic device 200. The display 208 allows the user to provide/select the inputs for performing the task using the neural network.

The memory 210 may store at least one of, but not limited to, the information/specification of the one or more processors 202a-202n of the one or more chipsets 202, the neural network, the one or more inputs, the requested one or more tasks, the unified neural network profile, the current parameters of the one or more processors 202a-202n, the plurality of combinations of the subnets, information about the selected combination of the subnets, and so on. Examples of the memory 210 may include, but not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 210 may include one or more computer-readable storage media. The memory 210 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in Random Access Memory (RAM) or cache).

FIG. 2 shows exemplary units of the electronic device 200, but it is to be understood that other embodiments are not limited thereon. In other embodiments, the electronic device 200 may include less or more number of units. Further, the labels or names of the units are used only for illustrative purpose and does not limit the scope of the embodiments herein. One or more units may be combined together to perform same or substantially similar function in the electronic device 200.

Figure 3:
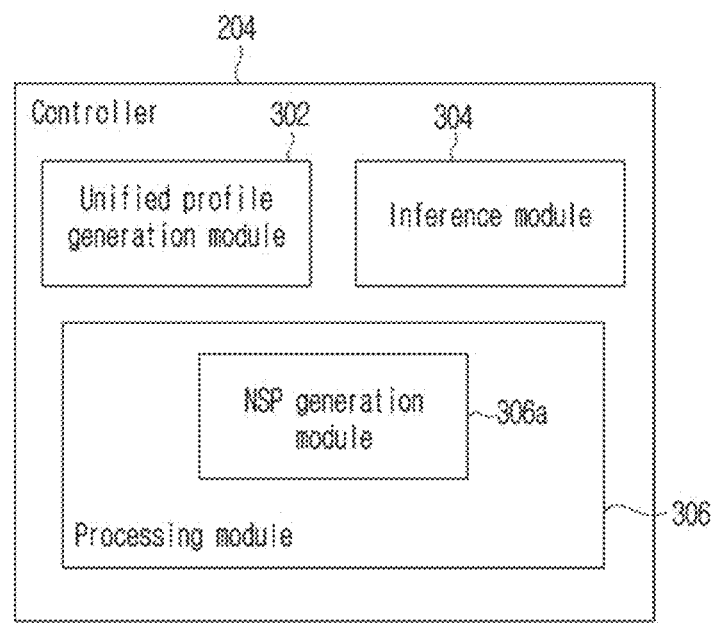
FIG. 3 is a block diagram depicting various components of a controller of the electronic device for managing processing of a neural network across heterogeneous processors, according to embodiments as disclosed herein.

FIG. 3 is a block diagram depicting various components of the controller 204 of the electronic device 200 for managing processing of the neural network across the heterogeneous processors 202a-202n, according to embodiments as disclosed herein. The controller 204 includes a unified profile generation module 302, an inference module 304, and a processing module 306.

The unified profile generation module 302 may be configured to generate the unified neural network profile for the one or more processors 202a-202n of the one or more chipsets 202 present in the electronic device 200. The unified neural network profile may be used to allocate the one or more processors 202a-202n for processing the neural network to perform the task(s) on the one or more inputs. The unified profile generation module 302 receives the neural network from the at least one external entity. Alternatively, the unified profile generation module 302 receives the training information from the at least one external entity and generates the neural network using the received training information. Upon or after receiving/generating the neural network, the unified profile generation module 302 analyzes the neural network and extracts the metadata of the neural network for the one or more tasks, which are related to the one or more applications implemented within the neural network.

On extracting the metadata of the neural network for the one or more tasks, the unified profile generation module 302 accesses the information/specification of the one or more processors 202a-202n stored in the memory 210. The information/specification may be at least one of, but not limited to, the data types supported by each processor 202a-202n, the resources allocated for each processor 202a-202n, and so on. The unified profile generation module 302 further determines at least one of, but not limited to, the time required by each processor 202a-202n to process each layer of the neural network for the one or more tasks, the overheads including the data type conversion overhead and the data copy overhead, and so on. The unified profile generation module 302 generates a data set by including the metadata of the neural network for the one or more tasks, and the profiles of the one or more processors 202a-202n. The profiles of the one or more processors 202a-202n include the information/specification of the processors 202a-202n, the time required by each processor 202a-202n to process each layer of the neural network for the one or more tasks, the overheads and so on. The generated data set may be the unified neural network profile. The unified profile generation module 302 stores the generated unified neural network profile in the memory 210.

The inference module 304 may be configured to classify the task(s) into the asynchronous task or the synchronous task, upon or after receiving the request for performing the task on the one or more inputs using the neural network. The inference module 304 checks if the order of the one or more outputs (that have to be generated for the one or more inputs) depends on the order of the one or more inputs for classifying the requested task. If the order of the one or more outputs does not depend on the order of the one or more inputs, the inference module 304 classifies the requested task into the asynchronous task. If the order of the one or more outputs depends on the order of the one or more inputs, the inference module 304 classifies the requested task into the synchronous task. The inference module 304 provides information about the classified task to the processing module 306.

The processing module 306 may be configured to manage processing of the neural network across the one or more processors 202a-202n, based on the classification of the requested task. The neural network may be processed to perform the requested task on the received one or more inputs and to generate the one or more outputs corresponding to the one or more inputs.

The processing module 306 may determine the parallel processing of the neural network, if the requested task is classified into the asynchronous task. For parallel processing, the processing module 306 accesses the unified neural network profile from the memory 210. The processing module 306 extracts the metadata of the neural network and the profiles of the one or more processors 202a-202n from the accessed unified neural network profile for the requested task. The processing module 306 further determines the current parameters (for example: processing speed, load and busy status, available resources, or the like) of the one or more processors 202a-202n. Based on the metadata of the neural network for the requested task, the profiles of the one or more processors 202a-202n, and the current parameters of the one or more processors 202a-202n, the processing module 306 allocates the one or more processors 202a-202n for each of the received one or more inputs.

On allocating the one or more processors for each of the one or more inputs, the processing module 306 copies the extracted metadata of the neural network for the requested task on each allocated processor 202a-202n. The processing module 306 also provides the corresponding input for each allocated processor 202a-202n. The processing module 306 enables the one or more allocated processors 202a-202n to process the layers of the neural network for the corresponding one or more inputs in parallel. Each allocated processor 202a-202n processes the layers of the neural network based on the copied metadata for the corresponding one or more inputs. Processing the layers of the neural network for each input refers to performing the requested task on the corresponding input and generating the output for the corresponding input. Thus, processing of the neural network for each of the one or more inputs in parallel results in efficient utilization of the processors 202a-202n, which further reduces time consumption and overheads on the processors 202a-202n.

Embodiments herein explain the allocation of the one or more processors 202a-202n for the parallel processing of the neural network by considering the time required by each processor to process the neural network, the load on each processor, the busy status of each processor (i.e., by checking if each processor is assigned with some other task or free) as example parameters, but it may be obvious to a person skilled in the art that any other parameters may be considered.

For the parallel processing of the neural network, the processing module 306 uses the metadata of the neural network extracted from the unified neural network profile and identifies information related to the neural network such as, but not limited to, a number of layers defined for the requested task, a sequence order pre-defined for processing the layers for the requested task, weights/biases related to each layer defined for the requested task, inputs and outputs of each layer defined for the requested task, and so on. The processing module 306 uses the profiles of the processors 202a-202n extracted from the unified neural network profile and identifies the time required by each processor 202a-202n to process the layers of the neural network (defined for the requested task) in the pre-defined sequence order for the requested task. The processing module 306 also determines current load on each processor 202a and the busy status of each processor 202a. Based on the time required by each processor 202a, the current load on each processor 202a and the busy status of each processor 202a, the processing module 306 allocates the one or more processors 202a-202n for the one or more inputs.

Consider an example scenario, wherein the processing module 306 receives information from the inference module 304 indicating that the requested task is the asynchronous task, which has to be performed on three inputs (an input 1, an input 2, and an input 3). In such a scenario, the processing module 306 identifies that the processors 202a-202n such as a processor 1, a processor 2, a processor 3, and a processor 4 require 20 milliseconds (ms), 50 ms, 30 ms, and 40 ms respectively for processing the layers of the neural network defined for the requested task in the pre-defined sequence order. The processing module 306 also determines that the processor 1 and the processor 3 may have lesser load compared to the processor 2 and the processor 4. The processing module 306 also determines that the processor 1 and the processor 3 are free for assigning the task.

On determining the time required for processing, the load on the processors 202a-202n and the busy status of the processors, the processing module 306 allocates the processor 1 for the input 1 and the input 3 and the processor 3 for the input 2. The processing module 306 provides the information/metadata of the neural network for the requested asynchronous task and the inputs 1 and 3 to the processor 1.

The processing module 306 provides the information/metadata of the neural network for the requested asynchronous task and the input 2 to the processor 3. Based on the received information of the neural network, the processor 1 and the processor 3 initiate processing of the layers of the neural network in parallel to perform the requested task on the inputs 1 and 2 respectively and generate outputs 1 and 2 corresponding to the inputs 1 and 2 respectively. On generating the output 1 corresponding to the input 1, the processor 1 initiates processing of the layers of the neural network to perform the requested task on the input 3 and to generate an output 3 corresponding to the input 3. Thus, the requested task may be performed by consuming 40 ms in an example herein.

The processing module 306 may determine the pipelining processing of the neural network, if the requested task is classified into the synchronous task. If the requested task is the synchronous task, the processing module 306 splits the neural network into the subnets and manages processing of the subnets across the one or more processors 202a-202n.

The processing module 306 includes a neural subnet packet (NSP) generation sub-module 306a to generate the subnets of the neural network.

The NSP generation sub-module 306a may be configured to generate the subnets of the neural network for performing the synchronous task. For generating the subnets, the NSP generation sub-module 306a fetches the unified neural network profile from the memory 210 and identifies the metadata of the neural network and the profile of the available processors 202a-202n in the electronic device 200. The NSP generation sub-module 306a analyzes the topology of the neural network based on the identified metadata of the neural network. The NSP generation sub-module 306a also identifies the data types supported by each processor 202a-202n and the time required by each processor 202a-202n to process the layers of the neural network based on the identified profile of the processors 202a-202n.

The NSP generation sub-module 306a generates the plurality of combination of subnets of the neural network based on the analyzed topology of the neural network and the profile of the processors 202a-202n. Each combination may include one or more subnets. Each subnet may include the one or more layers of the neural network and the one or more layers may act as the split points for the corresponding subnet.

On splitting the neural network into the plurality of combinations of the subnets, the NSP generation sub-module 306a selects the processors 202a for the subnets of each combination based on the topological sort and the layer-wise profiling performed in the pre-processing step. The NSP generation sub-module 306a enables the selected processors 202a to process/execute the respective subnets and records the time taken by the processors 202a to process the subnets of each combination. The NSP generation sub-module 306a also records the data copy overhead associated with each combination of the subnets.

The NSP generation sub-module 306a then calculates the splitting cost associated with each split point of each subnet of each combination. The splitting cost may be calculated based on the time recorded by the processor 202a-202n to process the subnet, the data copy overhead, and so on.

In an example herein, consider that the NSP generation sub-module 306a divides the neural network into the plurality of combinations of the subnets. Each combination may include n subnets {N1, N2 . . . Nn). The subnets may include the split points {S1, S2, . . . Sn−1}. In an example herein, consider that the split points {S1, S2, . . . Sn−1} may be the indices of the neural network that divides the neural network into the n subnets. For each split point S(i) that divides the neural network into the subnets N(i+1), and N(i), the NSP generation sub-module 306a may calculate the splitting cost by the combined effects of the subnet's processing time difference, the data copy overhead, and so on. The overall splitting cost due to the split points {S1, S2, . . . Sn−1} may be calculated using the below equation:

$$\sum_{i=1}^{n-1}\left[(\text{time}(N_{max})-\text{time}(N_i)) + \sum_{k=1}^{io\_list(i)} \text{size}_{ki} * \text{overhead}_{ki}\right]$$

wherein, '$N_{max}$' may be the subnet having maximum processing time among all the subnets, 'io_list(i)' may be a number of inputs/outputs (I/O) of the subnet $N_i$, as each may have more than one output (depending upon an input dependency of next subnet in the topological sort of the neural network), and '$size_{ki}$' may be a size of kth I/O subnet $N_i$. Further, the data copy overhead may be calculated using buffers. In the above equation, '$overhead_{ki}$' may be the overhead of copying kth I/O buffer of subnet $N_i$ from their respective source to target processor 202a-202n.

Based on the calculated splitting cost associated with each split point, the NSP generation sub-module 306a selects the combination of the optimal split points among the plurality of combination of the subnets. The optimal split points may correspond to the split points with the minimal splitting cost compared to the other split points. The optimal split points may be selected based on an optimization function/rule. The optimization rule may be defined as below:

$$\text{Optimization rule} = \text{argmin}_{x \in D}(\text{SplittingCost}(\{x\}))$$

wherein, 'D' represents the plurality of combinations of subnets, and 'x' represents the combination of subnets including the split points associated with the minimal splitting cost, compared to the split points of the other combinations of subnets.

The NSP generation sub-module 306a splits the neural network into the subnets based on the selected combination of the optimal split points.

On splitting the neural network into the subnets, the processing module 306 allocates one of the processors 202a-202n for each subnet. For allocating the processors 202a-202n, the processing module 306 uses the unified neural network profile and extracts the profiles of the processors 202a-202n, which have been assigned for processing the one or more subnets in the one or more combinations of the subnets during the splitting of the neural network. The processing module 306 uses the recorded time to process the selected combination of the subnets and determines the time required by the assigned processors 202a-202n to process the one or more subnets in the selected combination of the subnets. The processing module 306 also determines the current parameters (for example: the load, the resources, the busy status, or the like) of the assigned processors 202a-202n. The processing module 306 allocates the processor 202a for each subnet of the selected combination of the subnets based on at least one of, but not limited to, the time recorded for processing the one or more subnets by the processors 202a-202n, the profiles of the processors 202a-202n, the current parameters of the processors 202a-202n, and so on, wherein the processors may include the processors 202a-202n that have been assigned for processing the plurality of combinations of the subnets.

The processing module 306 provides information about the corresponding subnet and the received one or more inputs to each allocated processor 202a-202n. The processing module 306 enables the allocated processors 202a-202n to process the corresponding subnets in the pipelining structure for each of the received inputs. Each allocated processor 202a processes the corresponding subnet for the different inputs in parallel. Processing the one or more subnets by the allocated processors 202a-202n refers to performing the requested task on the received one or more inputs and generating the one or more outputs corresponding to the received one or more inputs.

Consider an example scenario, wherein the processing module 306 enables the NSP generation sub-module 306a to generate the subnets of the neural network for the synchronous task. In such a scenario, the NSP generation sub-module 306a performs the topological sort on the neural network defined for the synchronous task. The NSP generation sub-module 306a also analyzes the profiles of the available processors 202a-202n in the electronic device 200. In an example herein, consider that the electronic device 200 includes two processors 202a-202n processors 202a-202n such as a processor 1 and a processor 2. In such a scenario, the NSP generation sub-module 306a analyzes the profiles of the processor 1 and the processor 2.

Upon or after performing the topological sort on the neural network and analyzing the profiles of the processor 1 and the processor 2, the NSP generation sub-module 306a generates two combinations of subnets for example herein (a combination A and a combination B). The combination A may include two subnets 1a and 2a and the combination B may include two subnets 1b and 2b. Each subnet of each combination may be associated with the split points. The NSP generation sub-module 306a assigns the fastest processor/processor 2 for processing the subnet with a number of higher layers and the slower processor/processor 1 for processing the subnet with a lower number of layers. In an example herein, the NSP generation sub-module 306a may assign the processor 1 for the subnet 1a and the processor 2 for the subnet 2a of the combination A. The NSP generation sub-module 306a may assign the processor 1 for the subnet 1b and the processor 2 for the subnet 2b of the combination B. The NSP generation sub-module 306a determines the time required by the processor 1 and the processor 2 to process the respective subnets in each combination and determines the data copy overhead. In an example herein, the data copy overhead involves time required for copying the processing output of the subnet 1 from the CPU to the GPU for processing the subnet 2 in each combination. The NSP generation sub-module 306a calculates the splitting cost associated with the split points of the subnets in each combination based on the determined time required by the processor 1 and the processor 2 to process the respective subnets in each combination and the determined data copy overhead for each combination. The NSP generation sub-module 306a selects the split points among the split points of each combination. The selected split points may correspond to the split points with minimal splitting cost compared to the other split points of the other combinations. In an example herein, the NSP generation sub-module 306a selects the split points in the combination B, as the split points in the combination B are associated with the minimal splitting cost. The splitting cost may be minimal for the split points in the combination B, as the difference between the processing time of the subnet 1b and the processing time of the subnet 2b is minimal and the data copy overhead between the subnet 1b and the subnet 2b is minimal. The NSP generation sub-module 306a may split the neural network into the subnets (a subnet 1 and a subnet 2) based on selected split points of the combination B (i.e., selecting the subnets of the combination B). On splitting the neural network into the subnets, the processing module 306 loads the subnet 1 on the processor 1 and the subnet 2 on the processor 2. The processing module 306 enables the processor 1 and the processor 2 to process the subnet 1 and the subnet 2 in the pipelining method for each of the received inputs.

FIG. 3 shows exemplary units of the controller 204, but it is to be understood that other embodiments are not limited thereon. In other embodiments, the controller 204 may include less or more number of units. Further, the labels or names of the units are used only for illustrative purpose and does not limit the scope of the embodiments herein. One or more units may be combined together to perform same or substantially similar function in the controller 204.

Figure 4:
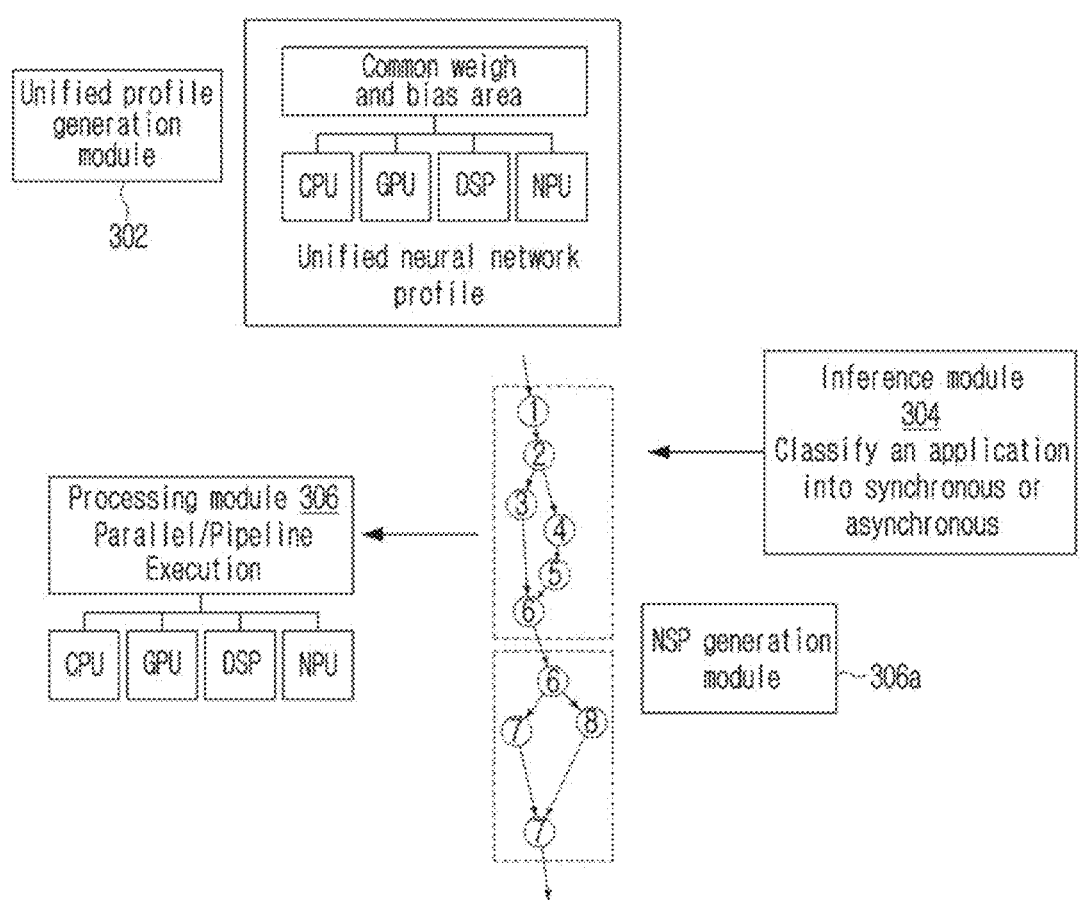
FIG. 4 is an example diagram depicting processing of the neural network across the processors to perform one or more tasks, according to embodiments as disclosed herein.

FIG. 4 is an example diagram depicting processing of the neural network across the processors 202a-202n to perform the one or more tasks, according to embodiments as disclosed herein.

Embodiments herein enable the electronic device 200 to manage processing of the neural network across the heterogeneous processors. In the initialization phase (i.e., prior to processing of the neural network), the electronic device 200 generates the unified neural network profile for all the processors 202a-202n. The unified neural network profile includes the metadata of the neural network for the one or more tasks and the profiles of the processors 202a-202n. As depicted in FIG. 4, the metadata of the neural network includes information such as, but not limited to, a number of layers, a sequence for processing the layers, the weights associated with each layer, the inputs and the outputs associated with each layer of the neural network, and so on. The profiles of each processor 202a-202n include information such as, but not limited to, the data types supported by the processor 202a-202n, the time required for the processor 202a-202n to execute the layers of the trained neural network, the overheads, and so on. The electronic device 200 stores the generated unified neural network profile in the memory 210. The generation of the unified neural network profile during the initialization phases avoids at least one of, but not limited to, calculation of the processing time of each processor 202a-202n to process the layers, the overheads, or the like, during an execution phase (in which the layers of the neural network may be processed to perform the task on the one or more inputs).

Upon or after receiving the request from the user to perform the task on the one or more inputs, the electronic device 200 initiates processing of the neural network across the processors 202a-202n using the unified neural network profile to perform the requested task on the one or more inputs. For performing the requested task, the electronic device 200 classifies the requested task into the asynchronous task or the synchronous task based on the type of the one or more inputs of the requested task.

The electronic device 200 determines the parallel processing of the neural network, if the requested task is the asynchronous task. For the parallel processing of the neural network, the electronic device 200 allocates the one or more processors 202a-202n for each of the one or more inputs, based on the stored unified neural network profile and the current parameters of each processor 202a-202n (for example: the load, the resources, the busy status or the like of each processor 202a-202n). The electronic device 200 enables the allocated one or more processors 202a-202n to process the layers of the neural network (defined for the requested task) for the corresponding one or more inputs in parallel. Processing the layers of the neural network involves performing the requested task on the one or more inputs and generating the one or more outputs corresponding to the one or more inputs.

The electronic device 200 determines the pipelining processing of the neural network, if the requested task is the synchronous task. For the pipelining processing of the neural network, the electronic device 200 performs the topological sort of the neural network and analyses the profile of the available processors 202a-202n. Based on the topological sort of the neural network, the electronic device 200 splits the neural network into the plurality of combinations of subnets. Each combination may include the one or more subnets. Each subnet may include the one or more layers and the one or more layers may form the split points of each subnet. The electronic device 200 calculates the splitting cost associated with the split points of each subnet of each combination based on the combined effects of at least one of, but not limited to, the subnet's processing time difference, the data copy overhead, and so on. The subnet's processing time difference may be determined by assigning the processors 202a-202n to each subnet of each combination, based on the analyzed profiles of the processors 202a-202n and the time taken by each assigned processor 202a-202n to process the respective subnet. The electronic device 200 selects the split points of the specific combination, which may be associated with the minimal splitting cost compared to the other split points of the other combinations. The electronic device 200 splits the neural network into the subnets based on the selected split points. The electronic device 200 allocates the processors 202a-202n to the subnets, based on the profiles of the processors 202a-202n. The electronic device 200 further loads the subnets in the respective allocated processors 202a-202n and enables the processors 202a-202n to process the respective subnets in the pipelining method.

Figure 5A:
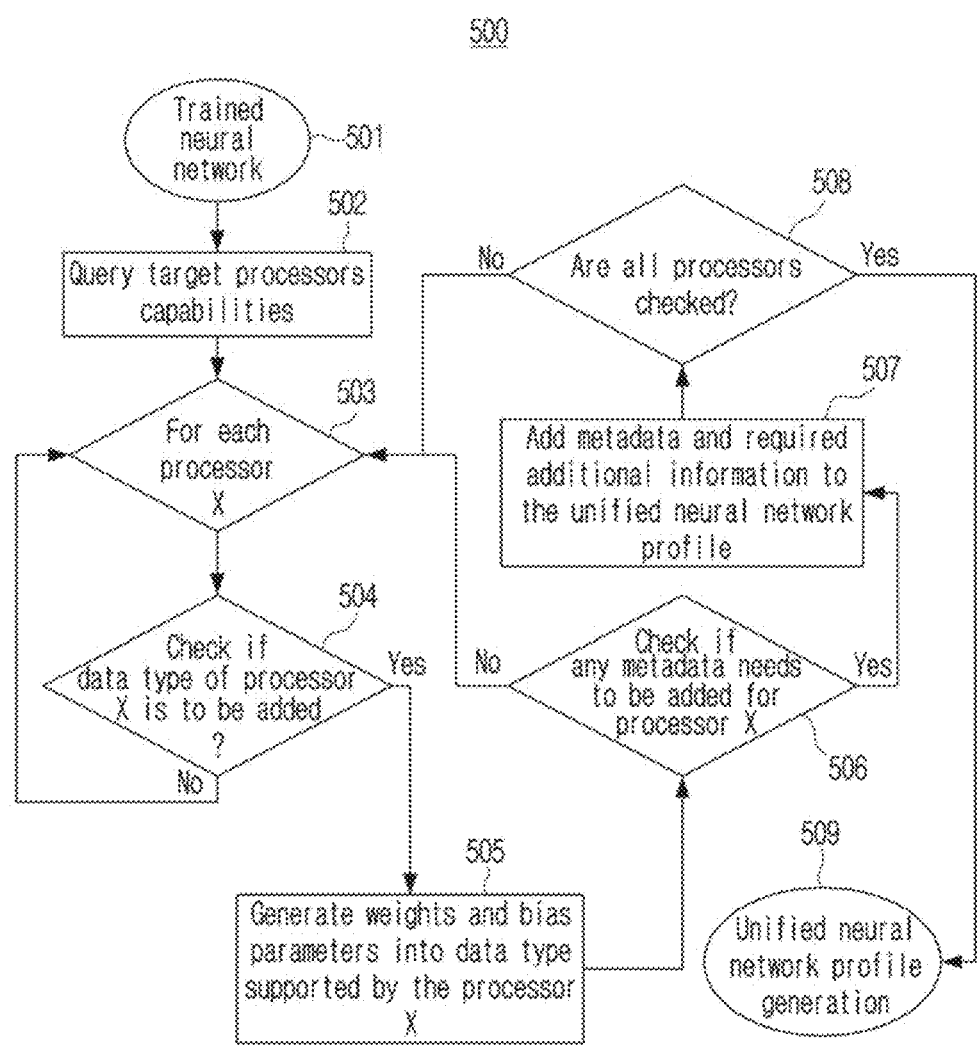
FIG. 5A is an example flow diagram depicting a method for creating a unified neural network profile, according to embodiments as disclosed herein.

FIG. 5A is an example flow diagram depicting a method 500 for creating the unified neural network profile, according to embodiments as disclosed herein.

Figure 5B:
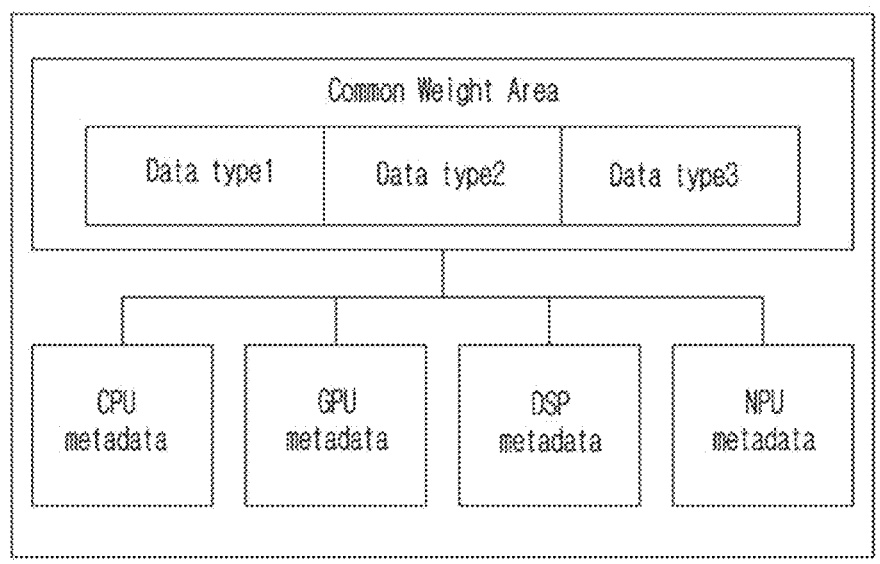
FIG. 5B depicts metadata of the neural network, according to embodiments as disclosed herein.

At step 501, the electronic device 200 receives the trained neural network from the at least one external entity. Alternatively, the electronic device 200 trains the neural network upon or after receiving the training information from the at least one external entity. The trained neural network may be the neural network in which the activation functions, the weights/biases, the inputs and outputs, of each layer may be known and fixed for performing the one or more tasks. The electronic device 200 creates the data set by including the metadata of the neural network. In an example as depicted in FIG. 5B, the metadata may include information such as, but not limited to, the number of layers of the neural network, the weights/biases of each layer, the inputs and the outputs of each layer of the neural network, and so on.

Figure 5C:
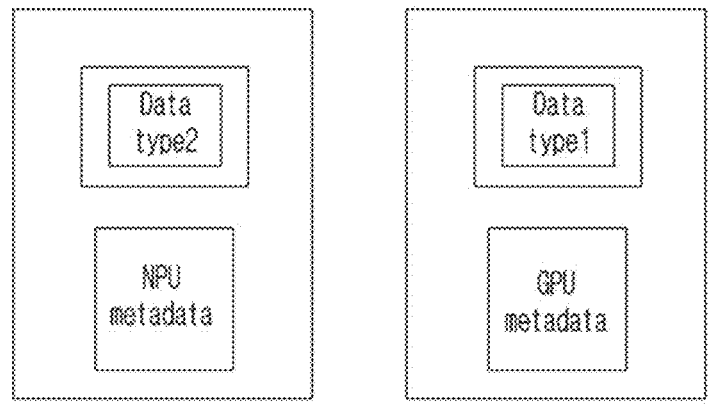
FIG. 5C depicts profiles of the processors, according to embodiments as disclosed herein.

At step 502, the electronic device 200 extracts the specification and/or information of the processors 202a-202n from the memory 210 and initiates checking of the profile/computing capabilities of all the processors 202a-202n from the extracted specification. In an example as depicted in FIG. 5C, the profiles of the processors 202a-202n may be, but is not limited to, the data types that may be processed by the processors 202a-202n, the time required by the processors 202a-202n to process the layers of the neural network, and so on.

At step 503, the electronic device 200 initiates querying of each of the processors 202a-202n that may process the neural network one by one. At step 504, the electronic device 200 determines if the profile of the processor 202a-202n has to be added in created the data set. If the profile of the processor 202a has already been added in the created data set, the electronic device 200 repeats the step 503 for the next processors 202a-202n.

If the profile of the processor 202a-202n has not been added in the created data set, at step 505, the electronic device 200 determines the data type supported by the processor 202a-202n using the profile of the processor 202a-202n and generates the weights and bias parameters into the data type supported by the processors 202a-202n.

At step 506, the electronic device 200 checks if the metadata of the neural network has to be added with respect to the profile of the processor 202a-202n in the created data set. If the metadata of the neural network with respect to the profile of the processor 202a-202n has already been added in the created data set, the electronic device 200 repeats the step 503-506.

If the metadata of the neural network has not been added with respect to the profile of the processor 202a in the created data set, at step 507, the electronic device 200 adds the metadata of the neural network with respect to the profile of the processor 202a-202n. At step 508, the electronic device 200 checks if all the processors 202a-202n have been queried. If all the processors 202a-202n have not been queried, the electronic device 200 repeats the steps 503-508. If all the processors 202a-202n have been queried, at step 509, the electronic device 200 considers the created data set including the metadata of the neural network with respect to the profiles of the processors 202a-202n as the unified neural network profile. The electronic device 200 stores the unified neural network profile in the memory 210. The unified neural network profile may be used for managing processing of the neural network across the processors 202a-202n to perform the task on the one or more inputs. The various actions in method 500 may be performed in the order presented, in a different order or simultaneously. Further, in some embodiments, some actions listed in FIG. 5 may be omitted.

Figure 6A:
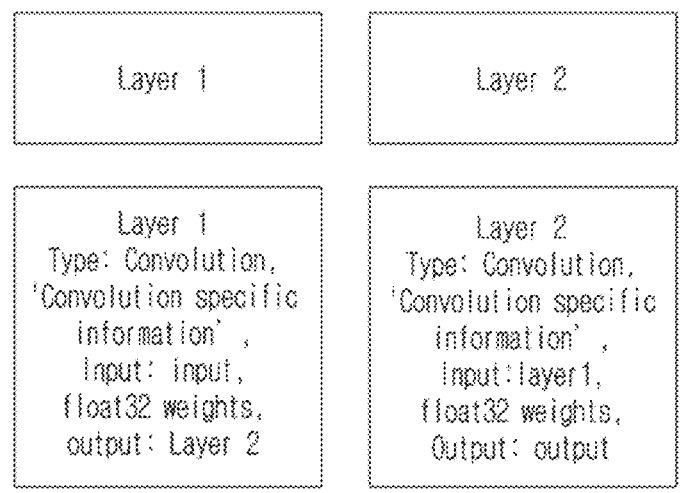
Figure 6B:
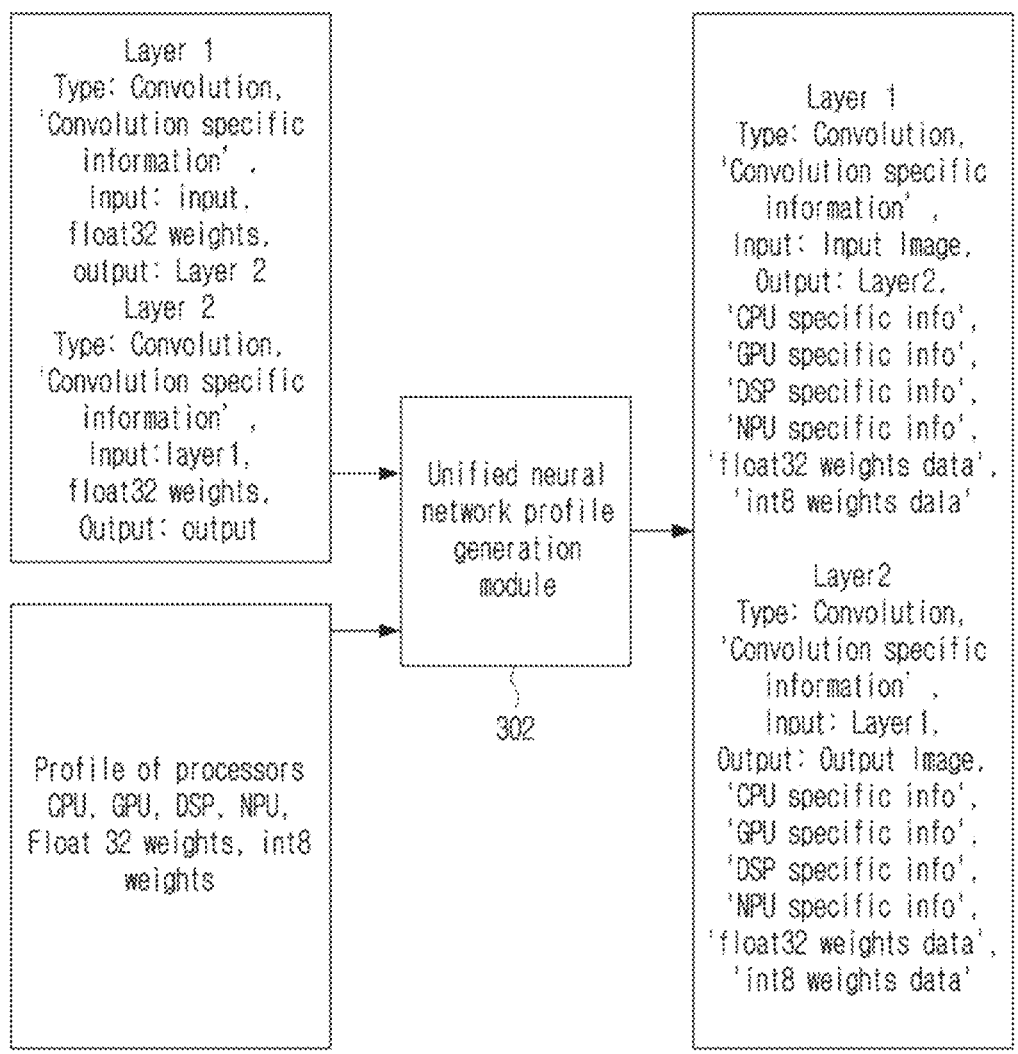

FIGS. 6A, 6B, and 6C are example diagrams depicting generation and utilization of the unified neural network profile for processing the neural network across the processors 202a-202n, according to embodiments as disclosed herein.

Consider an example scenario as depicted in FIG. 6A, wherein the electronic device 200 receives the neural network for the task, wherein the neural network includes a layer 1 and a layer 2. In such a scenario, for creating the unified neural network profile, the electronic device 200 extracts the metadata of the received neural network and identifies information related to the two layers of the neural network. For example, the identified information related to the layer 1 may be, but is not limited to, the layer 1 may be a convolutional layer, the layer 1 may be an input layer (i.e., the layer 1 may receive the input), the data type (for example: float 32) that may be used to process the weights of the layer 1, an output of the layer 1 (for example: the output for the layer 1 may be the layer 2), and so on. For example, the identified information related to the layer 2 may be, but is not limited to, the layer 2 may be the convolutional layer, the input for the layer 1 may be an output of the layer 1, the data type (for example: float 32) that may be used to process the weights of the layer 2, the layer 2 is an output layer (i.e., an output for the layer 2 may a final output), and so on.

On identifying the information related to the two layers of the neural network, the electronic device 200 creates the profiles for the processors 202a-202n present in the electronic device 200. In an example herein, consider that the electronic device 202 includes four processors 202a-202n (for example, the CPU, the DSP, the GPU, and the NPU). The electronic device 200 accesses the specification related to the four processors stored in the memory 210 and determines the data types supported by each of the four processors. The electronic device 200 also determines at least one of, but not limited to, the time required by each of the four processors to process the layer 1 and the layer 2 of the neural network, the overheads, and so on. The electronic device 200 creates the profile for each processor (for example: CPU profile/CPU specific information, DSP profile/DSP specific information, NPU profile/NPU specific information, and GPU profile/GPU specific information). The profile of each processor includes information such as, but not limited to, the data type supported by each processor, the time required by each processor to process the layer 1 and the layer 2 of the neural network, the overheads, and so on.

The electronic device 200 creates the data set by including the metadata of the neural network with respect to each of the four processors, as depicted in FIG. 6B. The created data set may be the unified neural network profile. In an example herein, as depicted in FIG. 6B, the unified neural network profile includes the metadata of the layer 1 and the layer 2 with respect to the CPU specific information, the DSP specific information, the NPU specific information, and the GPU specific information.

The electronic device 200 loads the created unified neural network profile on the available processors. For example, as depicted in FIG. 6C, the electronic device 200 loads the created unified neural network profile on the available processors such as, the CPU, the DSP and the NPU. When the electronic device 200 wants to process the layers of the neural network on the particular processor 202a-202n, the electronic device 200 selects the metadata of the layers with respect to the particular processor 202a-202n for processing the layers on the particular processor 202a-202n. For example, as depicted in FIG. 6C, electronic device 200 selects the metadata of the layers 1 and 2 with respect to the DSP (underlined in FIG. 6C) from the unified neural network profile to process the layers 1 and 2 on the DSP. Similarly, from the unified neural network profile, the electronic device 200 selects the metadata of the layer 1 with respect to the GPU for processing the layer 1 on the GPU and the metadata of the layer 2 with respect to the DSP for processing the layer 2 on the DSP. Similarly, from the unified neural network profile, the electronic device 200 selects the metadata of the layer 1 with respect to the NPU for processing the layer 1 on the NPU and the metadata of the layer 2 with respect to the GPU for processing the layer 2 on the GPU.

Figure 6D:
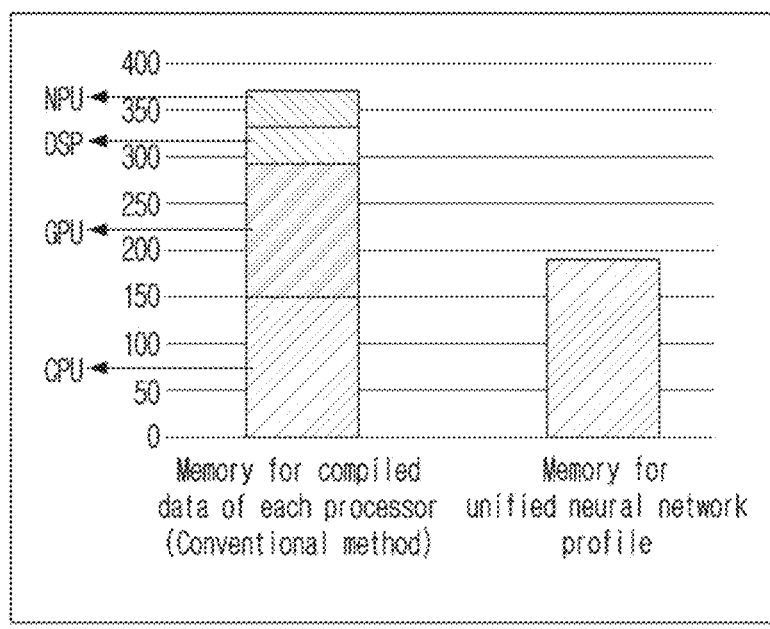
FIG. 6D is an example diagram depicting usage of a memory for storing the unified neural network profile, according to embodiments as disclosed herein.

FIG. 6D is an example diagram depicting usage of a memory for storing the unified neural network profile, according to embodiments as disclosed herein.

A conventional method of processing the neural network involves conversion of the neural network into a processor supported data type and an addition of metadata. Therefore, to process the neural network on the one or more processors, the neural network has to be converted separately for all the processors (redundant copy of network parameters of the same data type). Thus, in the conventional method, memory required for storing the information related to the neural network for each processor may be high.

In contrast, as the unified neural network profile includes the metadata/weights/bias of the neural network common for all the processors 202a-202n, the processors 202a-202n supporting the same data type may reuse the metadata of the neural network. Thus, the memory required for storing the unified neural network profile is less compared to the memory required for loading the metadata of the neural network for each processor separately in the conventional method.

Figure 7:
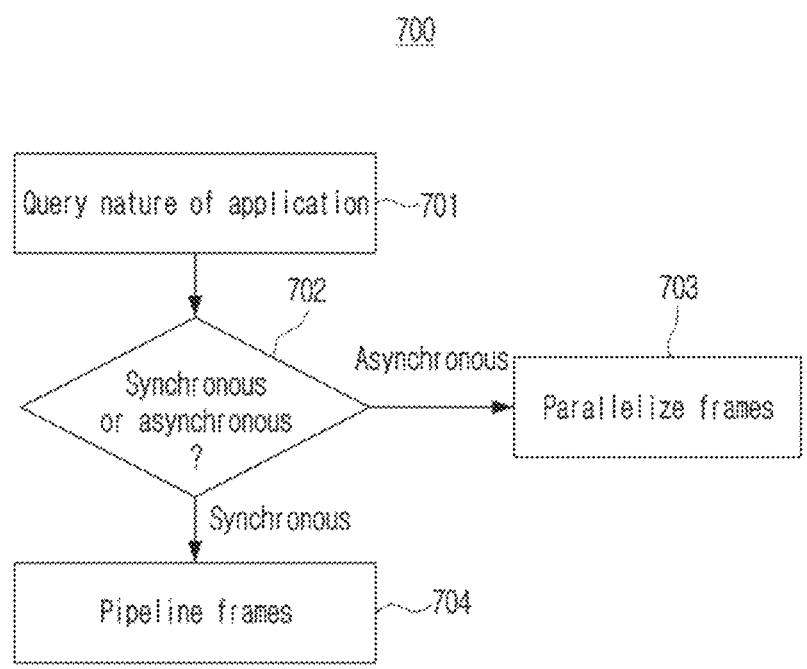
FIG. 7 is a flow diagram depicting a method for determining a type of processing of the neural network for a requested task based on a classification of the requested task, according to embodiments as disclosed herein.

FIG. 7 is a flow diagram depicting a method for determining the type of processing of the neural network for the requested task based on the classification of the requested task, according to embodiments as disclosed herein.

At step 701, the electronic device 200 receives the request from the user to perform the task on the one or more inputs. Upon or after receiving the request to perform the task, the electronic device 200 checks the type/nature of the requested task to classify the task. If the order of the one or more outputs (have to generated for the one or more inputs) depends on the order of the one or more inputs, the electronic device 200 classifies the requested task as the synchronous task. If the order of the one or more outputs (have to generated for the one or more inputs) does not depend on the order of the one or more inputs, the electronic device 200 classifies the requested task as the asynchronous task.

At step 702, the electronic device 200 checks if the requested task is the asynchronous task or the synchronous task.

If the requested task is the asynchronous task, at step 703, the electronic device 200 determines the parallel processing of the neural network for the asynchronous task. The parallel processing of the neural network involves processing of the layers of the neural network defined for the requested task on the one or more processors in parallel for the received one or more inputs. Processing of the layers of the neural network includes performing the requested task on the one or more inputs and generating the corresponding one or more outputs.

If the requested task is the synchronous task, at step 704, the electronic device 200 determines the pipelining processing of the neural network for the synchronous task. The pipelining processing of the neural network involves processing the subnets of the neural network in parallel on different processors 202a-202n for each input. The various actions in method 700 may be performed in the order presented, in a different order or simultaneously. Further, in some embodiments, some actions listed in FIG. 7 may be omitted.

Figure 8:
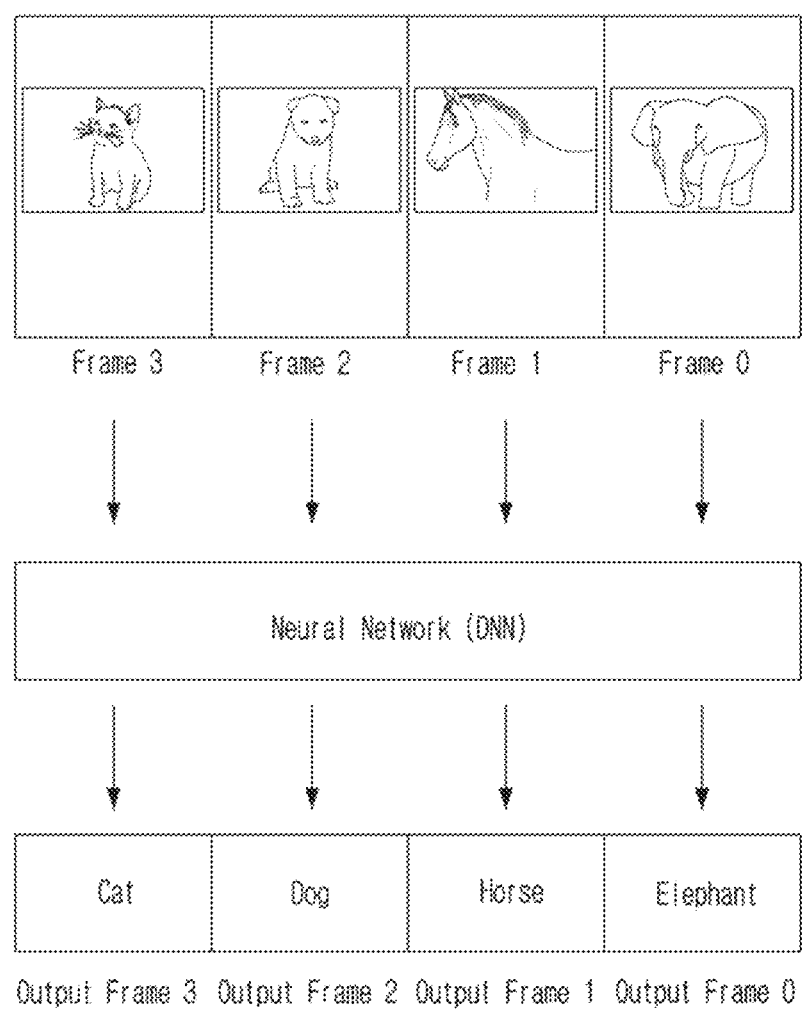
FIG. 8 is an example diagram depicting an asynchronous task, according to embodiments as disclosed herein.

FIG. 8 is an example diagram depicting the asynchronous task, according to embodiments as disclosed herein.

Examples of the asynchronous task referred herein may include, but is not limited to, media processing on the stored media (for example: applying a style on the stored media, a filter on the stored media, or the like), an object detection, an object classification, and so on.

Embodiments herein are further explained considering an object classification as the asynchronous task for example, but it may be obvious to a person skilled in the art that any other asynchronous task can be considered.

Consider an example scenario as depicted in FIG. 8, wherein the electronic device 200 receives a request for performing an example task of object classification on four input image frames (input frames 0-3). In such a scenario, the electronic device 200 may generate four output frames (output frames 0-3) corresponding to the four input image frames. The four output frames depict classification of objects present in the corresponding four input image frames. The order of generation of the four output frames does not depend on the order of the four input image frames. Thus, the electronic device 200 classifies the object classification as the asynchronous task.

For example, as depicted in FIG. 8, the electronic device 200 may generate the four output image frames in parallel for the received four input images, wherein the output image frames 0-3 may depict classification of the objects present in the input image frames 0-3 into an elephant, a horse, a dog, and a cat respectively. Thus, the electronic device 200 may classify the example task of object classification into the asynchronous task, as the order/sequence of the one or more outputs does not depend on the order/sequence of the one or more inputs.

FIGS. 9A-9D are example diagrams depicting the synchronous task, according to embodiments as disclosed herein.

Examples of the synchronous tasks may include, but not limited to, media processing, super resolution of the media, night mode task (for example: adjusting the display screen settings), or the like. The synchronous task includes real time inputs. For example, the real time inputs may be but not limited to, objects being captured from the camera application, and so on.

Embodiments herein are further explained considering applying a blur effect (an example task) on the one or more video frames (example inputs) as the synchronous task, but it may be obvious to a person skilled in the art that any other synchronous task may be considered.

Consider an example scenario, wherein the electronic device 200 receives a request from the user to perform an example task of applying a blur effect on four input video frames (input frames 0-3). In such a scenario, the electronic device 200 may generate four output video frames corresponding to the four input video frames, which include the blur effect. The order of generation of the four output video frames may depend on the order of the four input video frames. Thus, the electronic device 200 classifies the applying of the blur effect on the input video frames as the synchronous task.

Figure 9A:
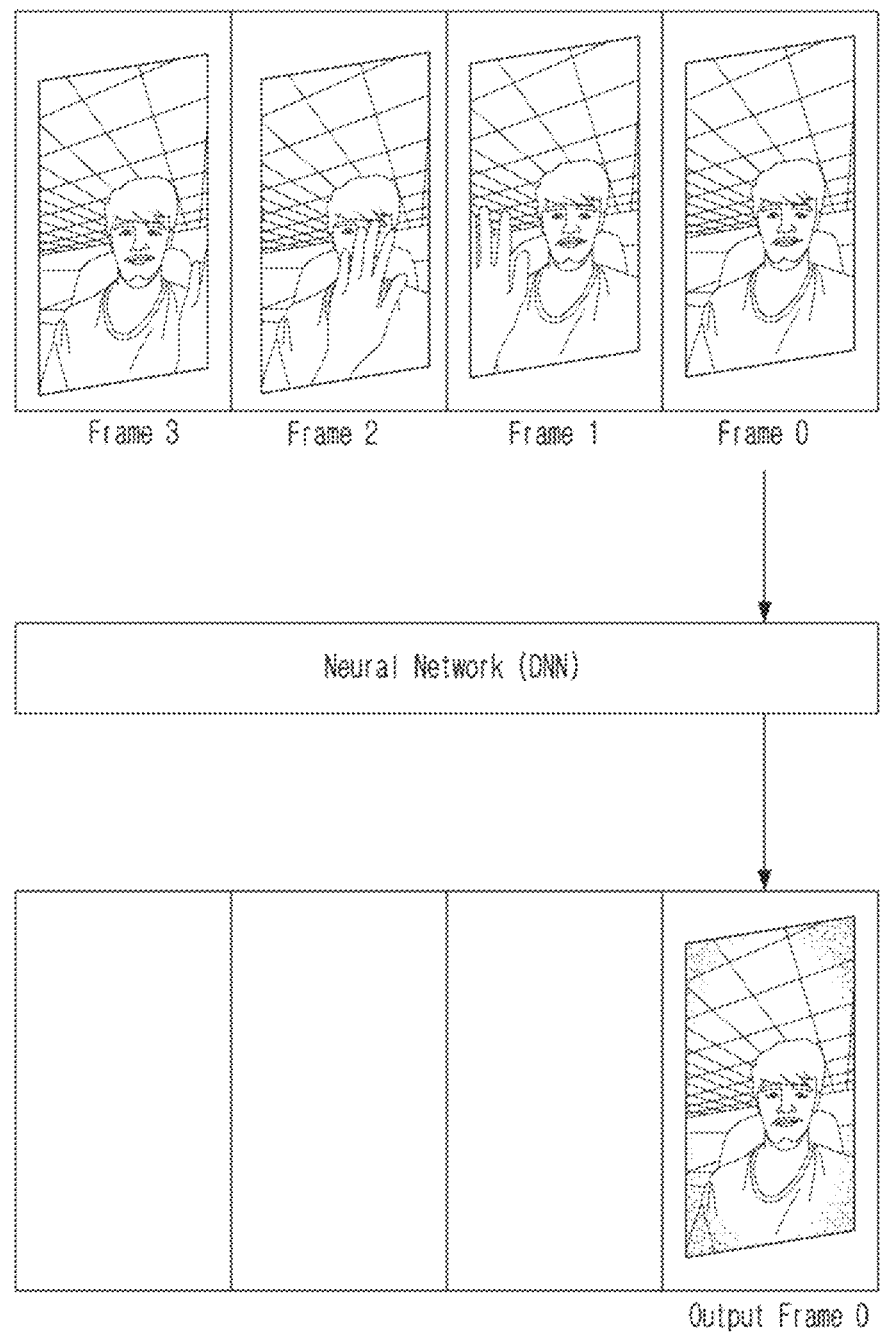
FIGS. 9A, 9B, 9C, and 9D are example diagrams depicting a synchronous task, according to embodiments as disclosed herein.
Figure 9B:
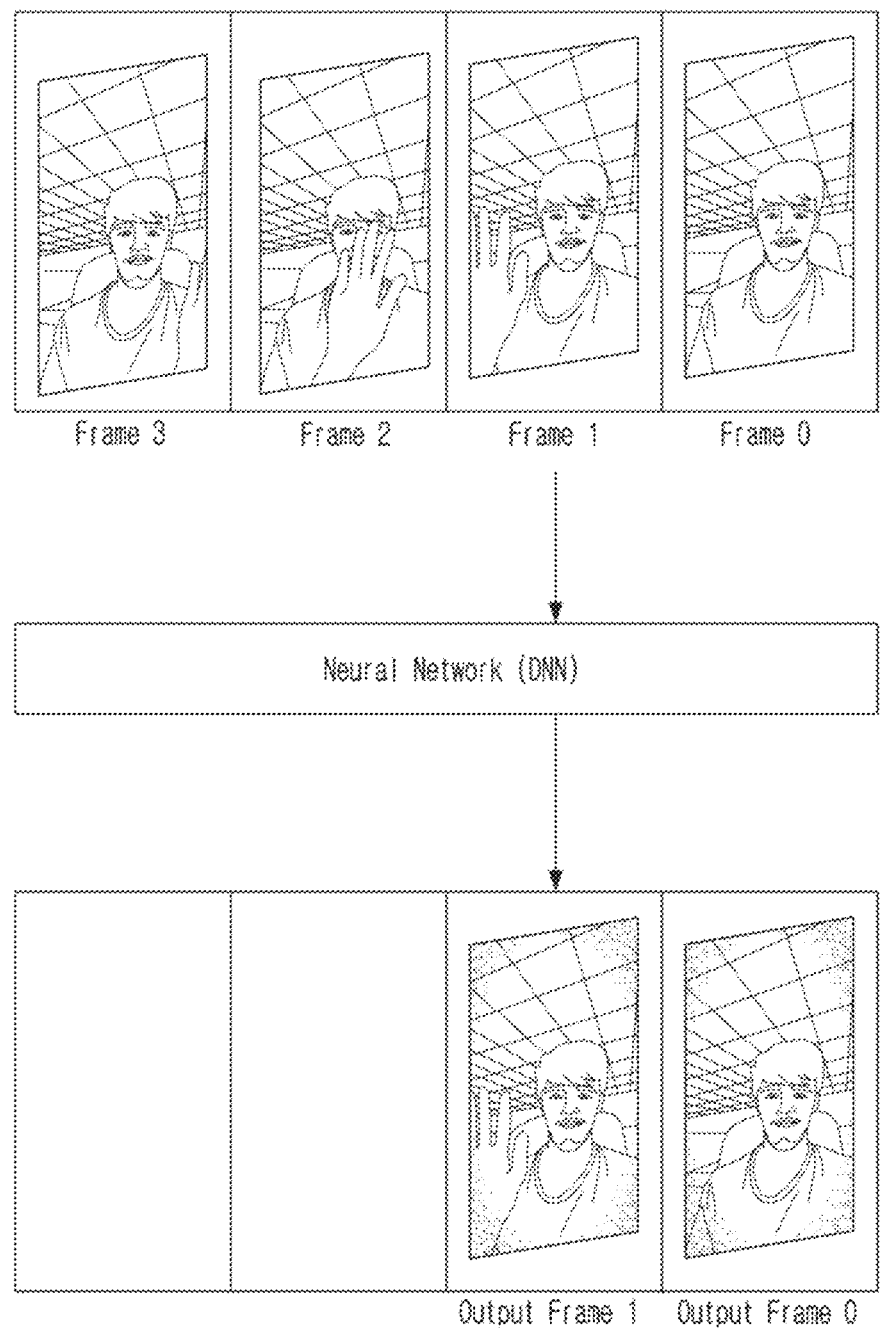
Figure 9C:
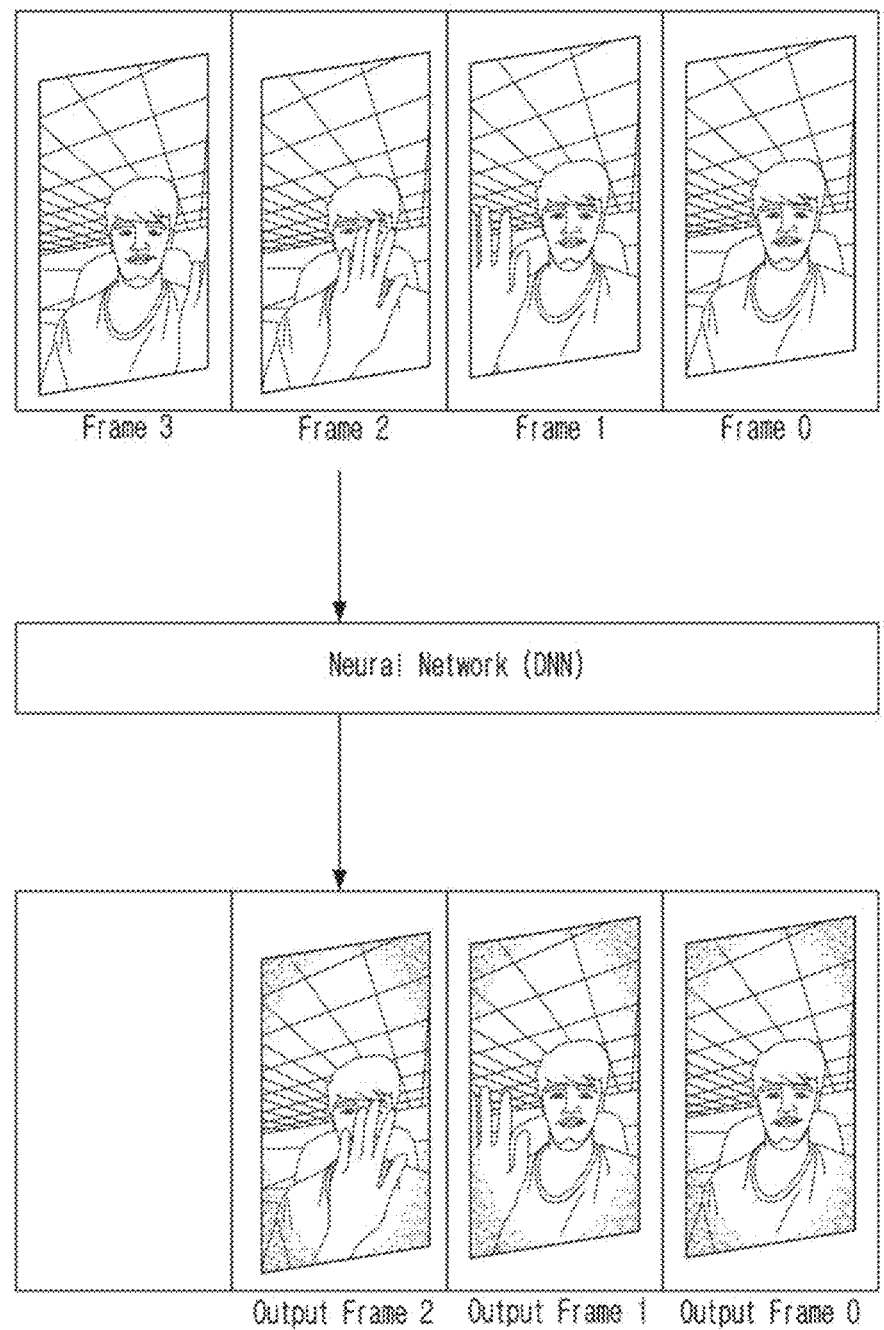
Figure 9D:
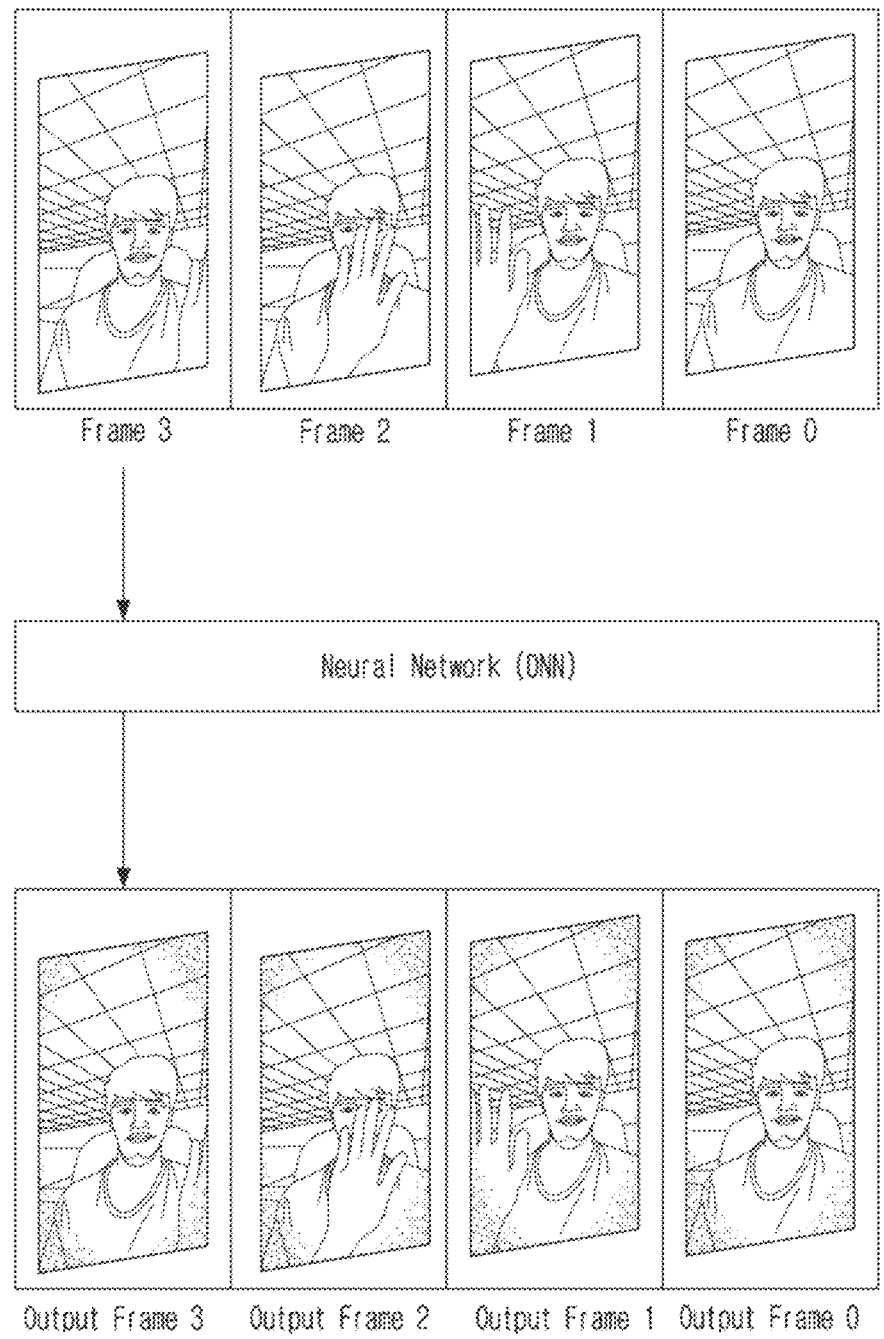

For example, as depicted in FIG. 9A, the electronic device 200 has to generate an output video frame 0 corresponding to the input frame 0. Only on generating the output video frame 0, the electronic device 200 has to generate an output video frame 1 corresponding to the input frame 1 as depicted in FIG. 9B. On generating the output video frame 1, the electronic device 200 has to generate an output video frame 2 corresponding to the input frame 2, as depicted in FIG. 9C. On generating the output video frame 2, the electronic device 200 has to generate the output video frame 3 corresponding to the input video frame 3, as depicted in FIG. 9D. On generating the output video frame 1-3, the electronic device 200 has to combine the output video frames to generate the output video for the received one or more inputs. Thus, the electronic device 200 classifies the example task of applying the blur effect as the synchronous task, as the order/sequence of the one or more outputs depends on the order/sequence of the one or more inputs.

Figure 10:
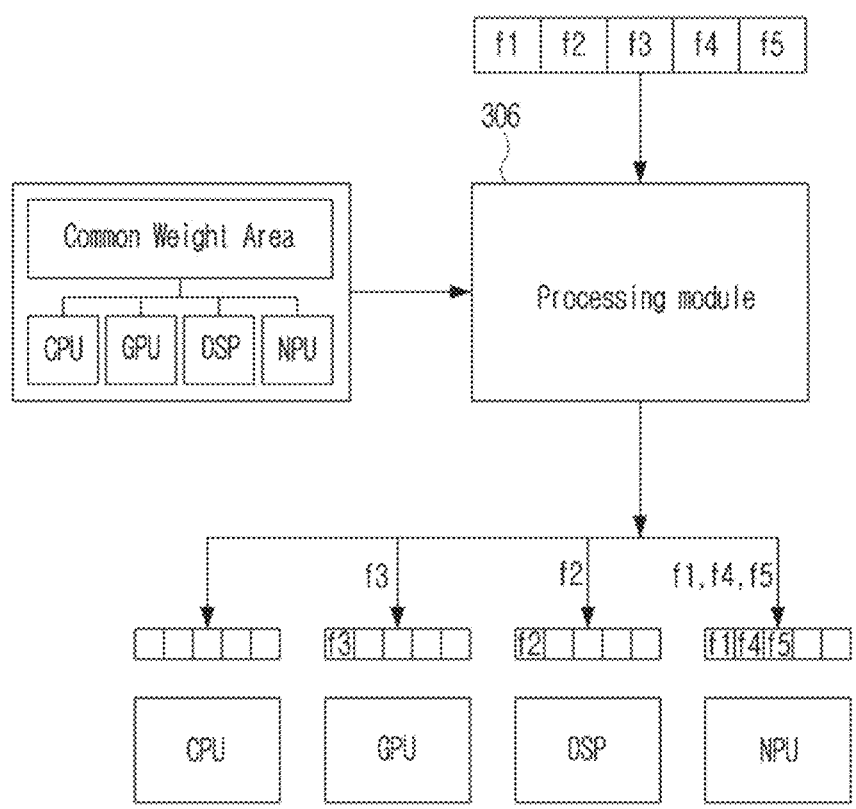
FIG. 10 is an example diagram depicting parallel processing of the neural network to perform the asynchronous task on one or more inputs, according to embodiments as disclosed herein.

FIG. 10 is an example diagram depicting the parallel processing of the neural network to perform the one or more tasks on the one or more inputs, according to embodiments as disclosed herein. Embodiments herein enable the electronic device 200 to parallelize the processing of the neural network across the processors 202a-202n to perform the task on the one or more inputs, if the task is the asynchronous task.

Consider an example scenario, wherein the electronic device 200 receives a request from the user to perform the asynchronous task on five input video frames (a frame 1, a frame 2, a frame 3, a frame 4, and a frame 5) using the neural network. The electronic device 200 includes four processors such as the CPU, the GPU, the DSP, and the NPU for processing the neural network. Upon or after receiving the five input video frames, the electronic device 200 fetches the unified neural network profile from the memory 210. The electronic device 200 extracts the metadata of the neural network and the profiles of the CPU, the GPU, the DSP, and the NPU. In an example herein, consider that the neural network may include three layers, which have been defined for the requested task. In such a case, the metadata of the neural network may include information such as, but not limited to, type of the three layers, the weights/biases of the three layers, the activation functions of the three layers, the inputs and the outputs of the three layers, the data types that may be required for processing the weights of the three layers, and so on. In an example, the extracted profiles of the four processors 202a-202n (the CPU, the GPU, the DSP, and the NPU) may include information such as, but not limited to, the data types supported by the each of the four processors, time required by each of the four processors to process each of the three layers, and so on. Based on the metadata of the neural network and the profiles of the processors, the electronic device 200 allocates the four processors for the five input video frames to perform the asynchronous task by processing the neural network in parallel.

In an example herein as depicted in FIG. 10, consider that the CPU, the GPU, the DSP, and the NPU requires 100 ms, 50 ms, 30 ms, and 20 ms respectively to process the neural network. In such a scenario, electronic device 200 may assign the NPU for the frames 1, 4, and 5, the DSP for the frame 2, and the GPU for the frame 1. The NPU, the DSP, and the GPU process the neural network in parallel for the respective frames 1, 4 and 5, the frame 2, and the frame 3 and generate outputs frames by performing the requested task on the respective frames 1, 4 and 5, the frame 2, and the frame 3. Thus, time required to process the neural network or to perform the task may be reduced. In an example herein, the time required to process the neural network may be 60 ms.

Figure 11A:
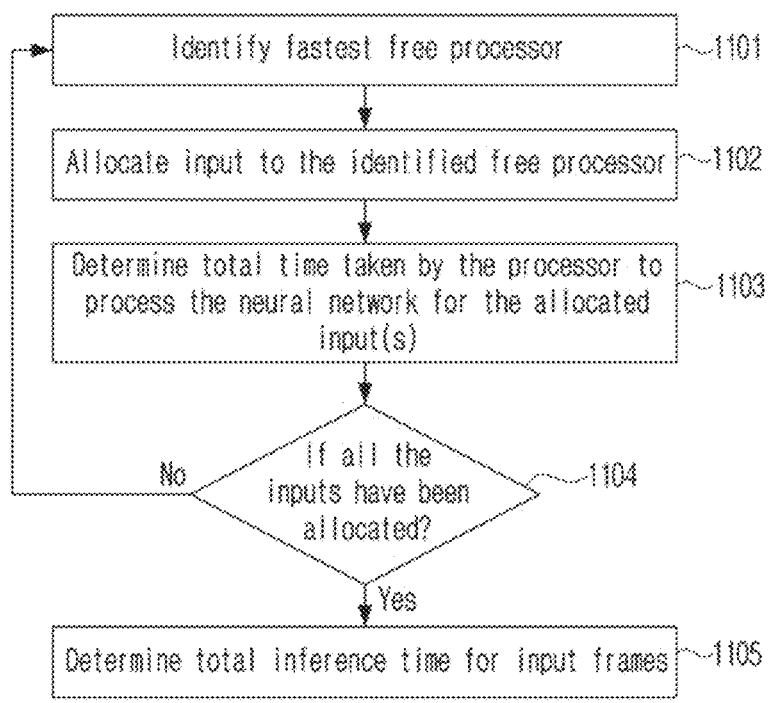
FIGS. 11A and 11B are example flow diagrams depicting a method for parallel processing of the neural network to perform the asynchronous task, according to embodiments as disclosed herein.
Figure 11B:
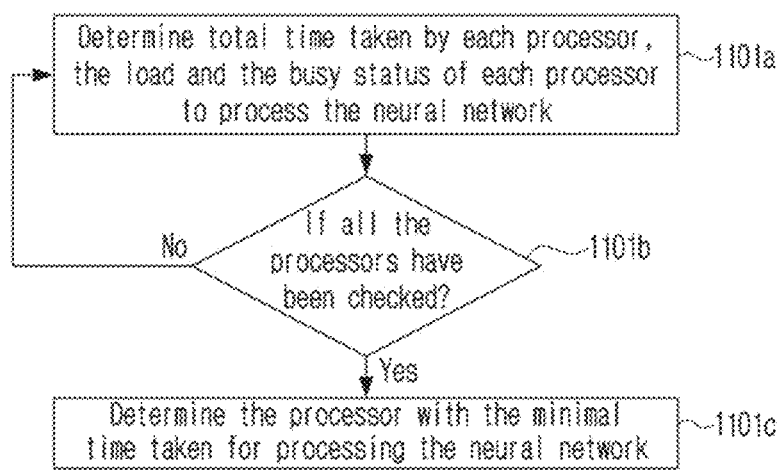

FIGS. 11A and 11B are example flow diagrams depicting method for parallel processing of the neural network for the asynchronous task, according to embodiments as disclosed herein. Embodiments herein enable the electronic device 200 to perform the parallel processing of the neural network across the available processors 202a-202n, upon or after receiving a request for performing the asynchronous task on the one or more inputs.

As depicted in FIG. 11A, at step 1101, the electronic device 200 identifies the fastest free/available processor to process the neural network for each input. For identifying the fastest processor, as depicted in FIG. 11B, at step 1101a, the electronic device 200 determines the time required by each processor 202a-202n to process the neutral network, and the current parameters of the processor 202a. The current parameters of the processor 202a-202n may include at least one of, but not limited to, the load on the processor, the busy status of the processor (if the processor is free or assigned with some other tasks), and so on. The electronic device 200 fetches the unified neural network profile from the memory 210 and identifies the profiles of each processor 202a-202n. The electronic device 200 analyzes the profiles of each processor 202a-202n and determines the time required by each processor 202a-202n to process the neural network. The electronic device 200 also determines the current parameters of each processor 202a-202n. At step 1101b, the electronic device 200 checks if the profiles of all the processors 202a-202n have been analyzed. If the profiles of all the processors 202a-202n have not been analyzed, the electronic device 200 repeats steps 1101a and 1101b. If the profiles of all the processors 202a-202n have been analyzed, at step 1101c, the electronic device 200 determines the fastest processor, based on the time required by each processor 202a-202n to process the neural network and the current parameters of each processor 202a-202n. The fastest free processor may correspond to the processor that requires less time compared to the other processors for processing the neural network and that may be not assigned with some other tasks (i.e., the processor is free).

On identifying the fastest free processor, at step 1102, the electronic device 200 allocates the input to the fastest free processor. At step 1103, the electronic device 200 determines the total time taken by the processor 202a to process the neural network for the allocated input(s). At step 1104, the electronic device 200 checks if all the inputs have been allocated. If all the inputs have not been allocated, the electronic device 200 repeats the steps 1101-1103. If all the inputs have been allocated, at step 1105, the electronic device 200 determines the total inference time for processing the neural network for all the inputs.

Consider an example scenario as depicted in FIG. 11C, wherein the electronic device 200 receives eight input video frames (input frames 0-7) to generate an output video. The output video includes eight output video frames (output frames 0-7) by performing the requested asynchronous task on the received eight input video frames. The electronic device 200 includes four processors 202a-202n such as, the CPU, the GPU, the DSP, and the NPU for processing the neural network. In such a scenario, the electronic device 200 allocates the one or more processors to process the neural network for each input frame in parallel, based on the time required by the four processors to process the layers of the neural network. The electronic device 200 may allocate the one or more processors for each input frame based on the metadata of the neural network, the profiles of the four processors, the current parameters of the four processors, and so on. Embodiments herein are further explained considering the time required by each of the four processors to process the neural network as an example parameter for allocating the processors 202a-202n for processing the neural network for each input frame, but it may be obvious to a person skilled in the art that any other parameters may be considered.

In an example, as depicted in FIG. 11C, the electronic device 200 determines that the CPU, the GPU, the DSP, and the NPU require 100 ms, 50 ms, 30 ms, and 20 ms respectively for processing the neural network for each input frame. In such a scenario as depicted in FIG. 11C, the electronic device 200 allocates the NPU for processing the neural network for the input frame 0, as the time (i.e., 20 ms) required by the NPU to process the neural network is less compared to the other processors 202a-202n.

The electronic device 200 allocates the DSP for processing the neural network for the input frame 1, as the time required by the DSP to process the neural network is less compared to the other processors.

The electronic device 200 allocates the NPU for processing the neural network for the input frame 2, as the time required by the NPU to process the neural network for the input frame 1, and the input frame 3 (i.e., 20 ms+20 ms) is less compared to the GPU and the CPU.

On allocating the processors 202a-202n for the frames 0-2, the electronic device 200 determines that the NPU has to process the neural network for the input frame 3 after processing the neural network for the input frames 0 and 2, so that the NPU requires 60 ms (40 ms+20 ms) to process the neural network for the input frames 0, 1, and 3. The electronic device 200 also determines that the DSP has to process the neural network for the input frame 3, after processing the neural network for the input frame 1, so that the DSP requires 60 ms (40 ms+20 ms) to process the neural network for the input frame 3. Thus, the electronic device 200 allocates the GPU for processing the neural network for the input frame 3, as the GPU requires 50 ms to process the neural network for the input frame 3 that is less than the DSP, the CPU, and the NPU.

On allocating the processors 202a-202n for the input frames 0-3, the electronic device 200 determines that the NPU has to process the input frame 4 after processing the input frame 0 and the input frame 1, so that the NPU requires 60 ms (20+20+20 ms) to process the neural network for the input frame 4. The electronic device 200 also determines that the DSP has to process the neural network for the input frame 4, after processing the input frame 2, so that the DSP requires 60 ms (30+30 ms) to process the neural network for the input frame 4. The electronic device 200 further determines that the GPU has to process the neural network for the input frame 4 on completion of processing the input frame 3, so that the GPU requires 100 ms (50+50 ms) for processing the neural network for the input frame 4. Thus, for the input frame 4, the electronic device 200 allocates the NPU for processing the neural network, as the NPU requires less time than the DSP, the CPU and the GPU for processing the neural network.

On allocating the processors 202a-202n for the input frames 0-4, the electronic device 200 determines that the NPU has to process the neural network for the input frame 5, on completion of the processing of the input frames 0, 2, and 4, so that the NPU requires 80 ms (20+20+20+20) for processing the neural network for the input frame 5. The electronic device 200 also determines that the DSP has to process the neural network for the input frame 5, after processing the input frame 2, so that the DSP requires 60 ms (30+30 ms) to process the neural network for the input frame 5. The electronic device 200 also determines that the GPU has to process the neural network for the input frame 5 on completion of processing the input frame 3, so that the GPU requires 100 ms (50+50 ms) for processing the neural network for the input frame 5. Thus, for the input frame 5, the electronic device 200 allocates the DSP for processing the neural network, as the DSP requires less time than the NPU and the GPU for processing the neural network.

As depicted in FIG. 11D, on allocating the processors for the input frames 0-5, the electronic device 200 determines that the NPU has to process the neural network for the input frame 6, on completion of processing the input frames 0, 2, and 4, so that the NPU requires 80 ms (20+20+20+20) for processing the neural network for the input frame 6. The electronic device 200 also determines that the DSP has to process the neural network for the input frame 6, after processing the input frames 2 and 5, so that the DSP requires 90 ms (30+30+30 ms) to process the neural network for the input frame 6. The electronic device 200 also determines that the GPU has to process the neural network for the input frame 6 on completion of processing the input frame 3, so that the GPU requires 100 ms (50+50 ms) for processing the neural network for the input frame 6. Thus, for the input frame 6, the electronic device 200 allocates the NPU for processing the neural network, as the NPU requires less time than the other processors.

On allocating the processors for the input frames 0-6, the electronic device 200 determines that the NPU has to process the neural network for the input frame 7 on completion of processing the input frames 0, 2, 4, and 6, so that the NPU requires 100 ms (20+20+20+20+20 ms) for processing the neural network for the input frame 7. The electronic device 200 also determines that the DSP has to process the neural network for the input frame 7, after processing the input frames 2 and 5, so that the DSP requires 90 ms (30+30+30 ms) to process the neural network for the input frame 7. The electronic device 200 also determines that the GPU has to process the neural network for the input frame 6 on completion of processing the input frame 3, so that the GPU requires 100 ms (50+50 ms) for processing the neural network for the input frame 7. Thus, for the input frame 7, the electronic device 200 allocates the DSP for processing the neural network, as the DSP requires less time compared to the other processors.

On allocating the processors for processing the neural network for each of the frames, the electronic device 200 enables the allocating processors for processing the neural network in parallel for the respective frames. In an example herein, 90 ms is required for processing the neural network for the received eight input frames. Thus, time required for performing the task on the input frames may be reduced.

Figure 11E:
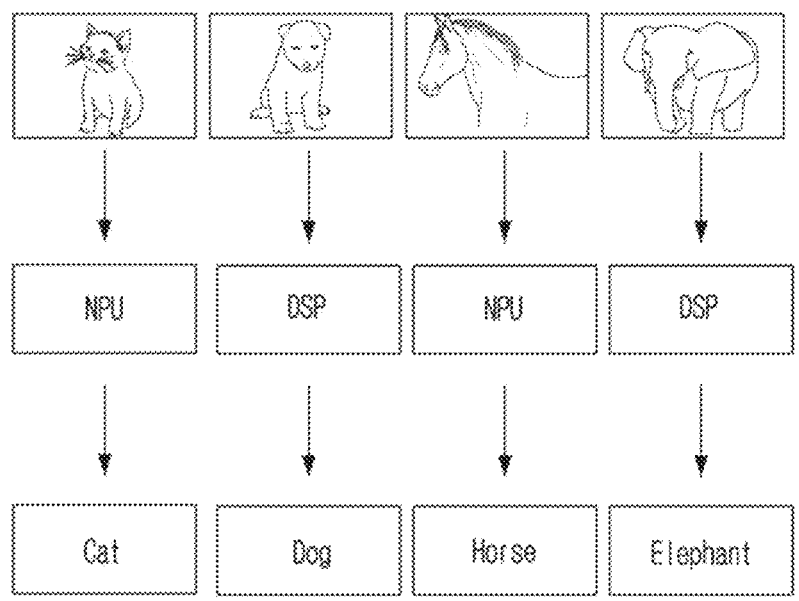
FIG. 11E is an example diagram depicting parallel processing of the neural network for performing an example task of object classification, according to embodiments as disclosed herein.

FIG. 11E is an example diagram depicting parallel processing of the neural network for performing an example task of object classification, according to embodiments as disclosed herein. Consider an example scenario, wherein the electronic device 200 receives a request from the user to perform an example asynchronous task of object classification on four input frames (input frame 0-input frame 1). The electronic device 200 includes the processors 202a-202n such as, the NPU, the GPU, the DSP, and the CPU. The NPU and the GPU require 10 ms to process the neural network for each input frame. The GPU and the CPU require 30 ms and 40 ms respectively to process the neural network for each input frame.

In such a scenario, the electronic device 200 allocates the NPU for the input frames 0 and 2 and the DSP for the input frames 1 and 3 and enables the NPU and the DSP to process the neural network in parallel. Thus, the neural network may be processed in 20 ms for the received four input frames. The NPU processes the neural network for the input frame 0 to perform the classification of the object present in the input frame 0 and generates an output frame 0 corresponding to the input frame 0. The output frame 0 depicts the classification of the object in the input frame 0 into a cat. On generating the output frame 0, the NPU processes the neural network for the input frame 2 to perform the classification of the object present in the input frame 2 and generates an output frame 2 corresponding to the input frame 2. The output frame 2 depicts the classification of the object in the input frame 2 into a dog. The DSP processes the neural network for the input frame 1 to perform the classification of the object present in the input frame 1 and generates an output frame 1 corresponding to the input frame 1. The output frame 1 depicts the classification of the object in the input frame 1 into an elephant. On generating the output frame 3, the DSP processes the neural network for the input frame 3 to perform the classification of the object present in the input frame 3 and generates an output frame 3 corresponding to the input frame 3. The output frame 3 depicts the classification of the object in the input frame 1 into a horse.

Figure 12A:
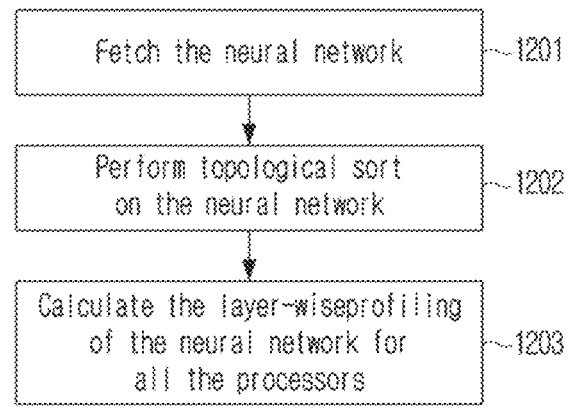
FIGS. 12A, 12B, and 12C are example flow diagrams depicting a method for splitting the neural network into sub-networks (subnets) for a synchronous task, according to embodiments as disclosed herein.
Figure 12B:
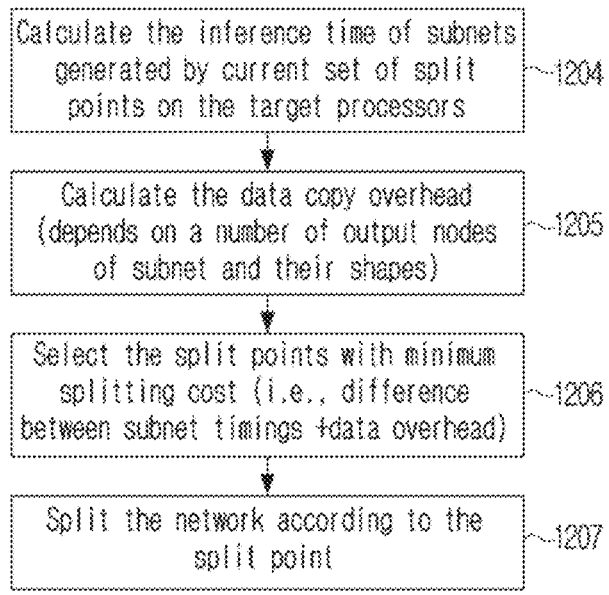
Figure 12B:
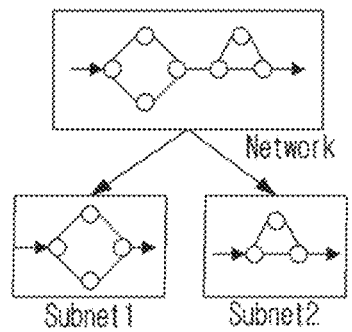
Figure 12C:
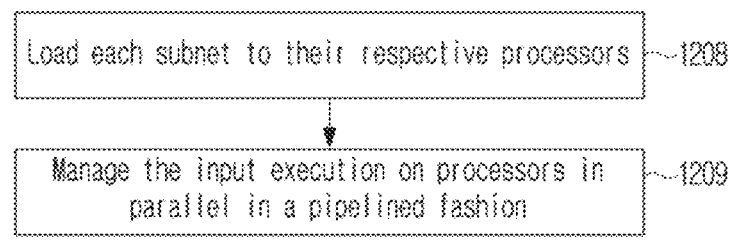

FIGS. 12A, 12B, and 12C are example flow diagrams depicting a method for splitting the neural network into the subnets for the synchronous task, according to embodiments as disclosed herein. Embodiments herein perform the synchronous task by performing the pre-processing step (as depicted in FIG. 12A), dividing the neural network into the subnets (as depicted in FIG. 12B) upon or after performing the pre-processing step, and managing the processing of the subnets (as depicted in FIG. 12C). In an example herein, the splitting/dividing of the neural network into the subnets may be performed only once/per use case (i.e., the application or the task) during the initialization phase.

As depicted in FIG. 12A, at step 1201, the electronic device 200 fetches the neural network defined for the asynchronous task, upon or after receiving a request for performing the synchronous task on the one or more inputs. At step 1202, the electronic device 200 performs the topological sort on the neural network. At step 1203, the electronic device 200 calculates the layer-wise profiling of the neural network for all the processors 202a-202n. The layer-wise profiling of the neural network involves identifying the profiles of the available processors 202a-202n using the unified neural network profile, and determining the time required by each processor 202a-202n to process the layers of the neural network using the identified profile of each processor 202a-202n.

As depicted in FIG. 12B, at step 1204, the electronic device 200 calculates the inference time (i.e., processing time) of the subnets generated by the current set of split points on the target processors 202a-202n. Based on the topological sort of the neural network, the electronic device 200 generates the plurality of combinations of subnets. Each subnets may include the one or more layers, which may act as the split points. The electronic device 200 also identifies the processors/target processors 202a-202n for processing the subnets of each combination, based on the calculated layer-wise profiling of the neural network for all the processors 202a-202n. The electronic device 200 enables the identified processors 202a-202n to process the respective subnets of each combination and records the time taken by the processors 202a-202n to process the respective subnets of each combination.

Upon or after calculating the inference time of the subnets, at step 1205, the electronic device 200 calculates the data copy overhead for each combination of subnets. The data copy overhead may depend on the size and shape of the subnets. The data copy overhead may correspond to the time taken for copying the processing output of one subnet to another subnet.

At step 1206, the electronic device 200 select the split points with the minimum splitting cost, upon or after calculating the inference time of the subnets and the data copy overhead. The electronic device 200 calculates the splitting cost associated with split point of each subnet of each combination based on the difference between the subnet's inference (processing) timings and the calculated data copy overhead. The selected split points may correspond to the split points with the minimum splitting cost, compared to other split points. At step 1207, the electronic device 200 splits the neural network into the subnets according to the selected split points.

As depicted in FIG. 12C, at step 1208, the electronic device 200 loads the subnets and the received inputs on the target processors 202a-202n (that are identified in the step 1204). At step 1209, the electronic device 200 enables the target processors 202a-202n to process the respective subnets in the pipelining method for each of the received inputs. The pipelining method involves managing processing of the subnets on the different target processors 202a-202n in parallel. The processing of the subnets may correspond to performing the requested synchronous task on the received inputs.

Figure 13A:
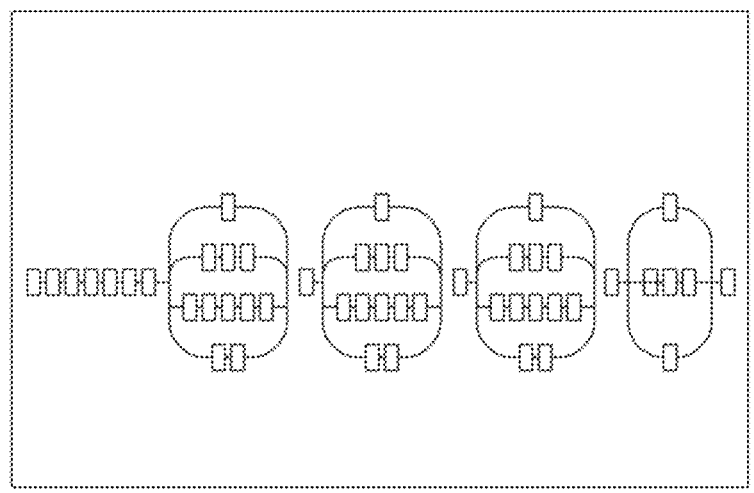
FIGS. 13A and 13B are example diagrams depicting splitting of the neural network into the subnets for performing the synchronous task, according to embodiments as disclosed herein.
Figure 13B:
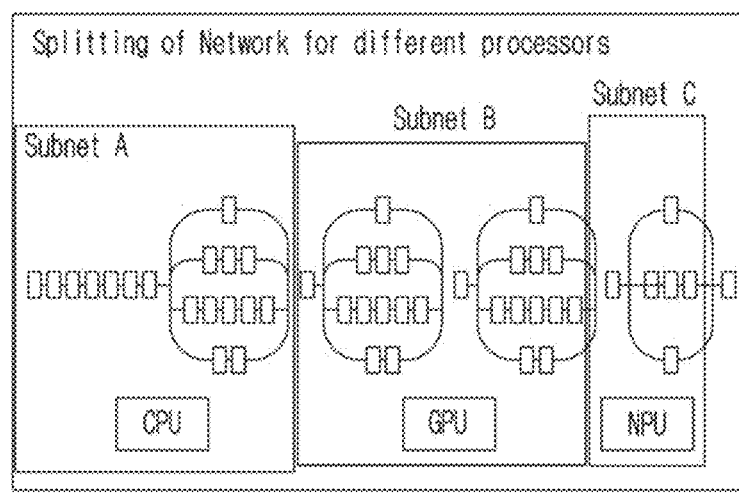

FIGS. 13A and 13B are example diagrams depicting the splitting of the neural network into the subnets for the synchronous task, according to embodiments as disclosed herein.

Consider an example scenario, wherein the electronic device 200 receives a request for performing the synchronous task on the one or more inputs. In such a scenario, the electronic device 200 fetches the trained neural network received from the at least one external entity for the synchronous task and determines that the neural network includes a plurality of layers connected in series and parallel as depicted in FIG. 13A. The electronic device 200 generates the combinations of subnets by performing the topological sort on the neural network and the layer-wise profiling of the neural network with respect to the available processors 202a-202n. The subnets of each combination may be formed by the split points. The electronic device 200 determines the splitting cost associated with each split point of each subnet of each combination based on the difference between the subnet's processing time and the data copy overhead. The electronic device 200 selects the split points associated with the minimal splitting cost, compared to the other split points. The electronic device 200 splits the neural network into the subnets based on the selected split points. In an example herein, the electronic device 200 splits the neural network into three subnets (a subnet A, a subnet B, and a subnet C) as depicted in FIG. 13B.

The electronic device 200 may further assigns the processors 202a-202n for the subnets A, B and C, based on the layer-wise profiling of the neural network with respect to the available processors 202a-202n. In an example herein, as depicted in FIG. 13B, the electronic device 200 assigns the CPU for the subnet A, the GPU for the subnet B, and the NPU for the subnet C.

Figure 14:
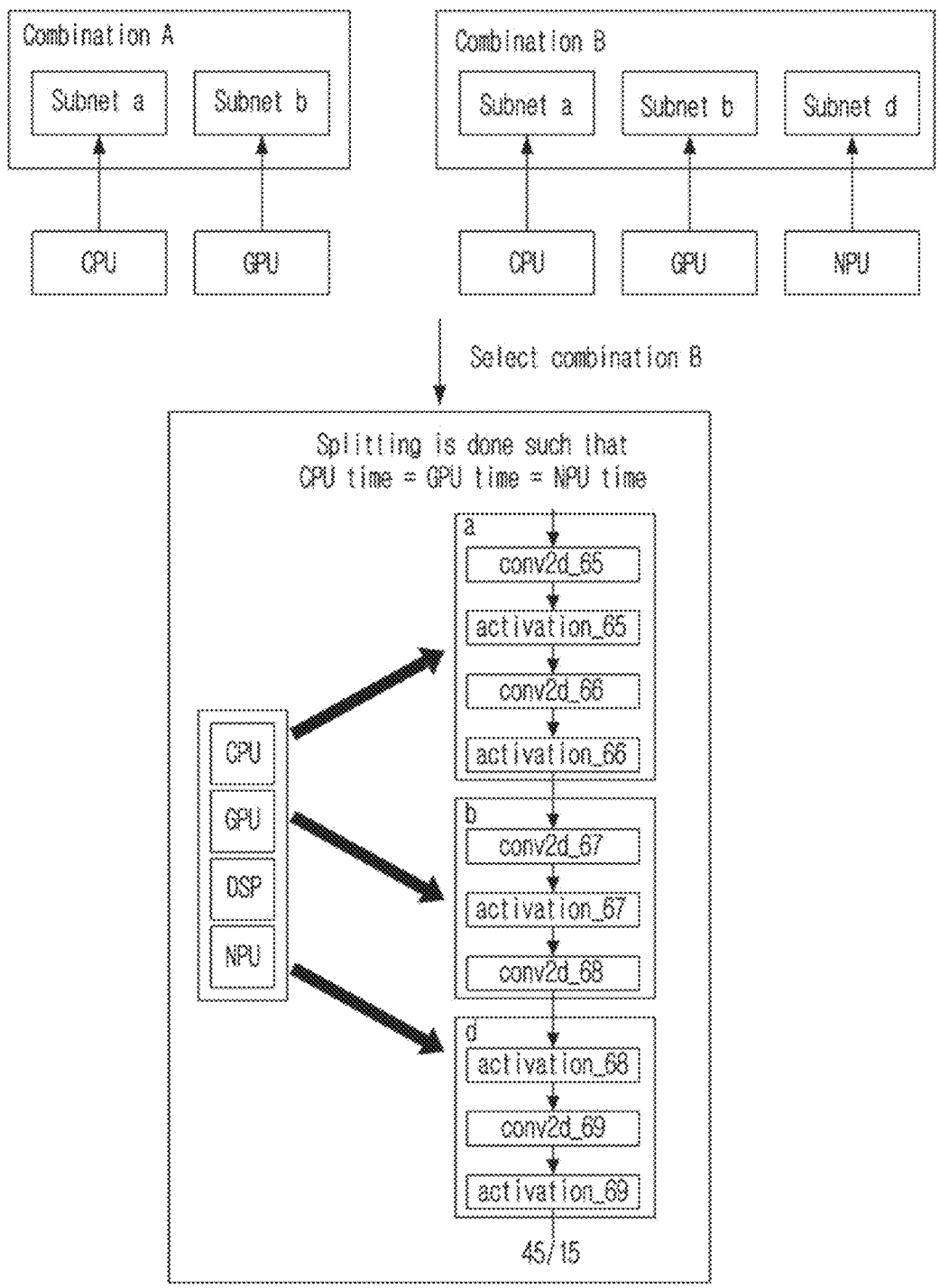
FIG. 14 is an example diagram depicting the splitting of the network into the subnets for performing the synchronous task and allocation of the processors for the subnets, according to embodiments as disclosed herein.

FIG. 14 is an example diagram depicting the splitting of the network into the subnets and allocation of the processors 202a-202n for the subnets, according to embodiments as disclosed herein. Consider an example scenario, wherein the electronic device 200 generates two combinations (a combination A and a combination B) of the subnets for the requested task, on performing the topological sort on the neural network. The combination A may include a subnet a, and a subnet b. In the combination A, the subnet a may include four activation layers, and three convolutional layers, and the subnet b may include two convolutional layers and an activation layer. In such a scenario, the electronic device 200 assigns the CPU and the GPU for processing the subnet a and the subnet b respectively in the combination A, based on the layer-wise profiling of the neural network with respect to the available processors 202a-202n. The electronic device 200 records time taken by the CPU and the GPU to process the corresponding subnets and the data copy overhead for the combination A.

The combination B may include a subnet a, a subnet b, and a subnet d. In the combination B, the subnet a may include two activation layers, and two convolutional layers, the subnet b may include two convolutional layers and an activation layer, and the subnet d may include two activation layers and a convolutional layer. The electronic device 200 assigns the CPU, the GPU and the NPU for processing the subnet a, the subnet b, and the subnet d respectively of the combination B, based on the layer-wise profiling of the neural network with respect to the available processors. The electronic device 200 records the time taken by the CPU, the GPU and the NPU for processing the corresponding subnets and the data copy overhead for the combination B. Based on the recorded time and the data copy overhead for each combination, the electronic device 200 selects the split points which may be associated with the minimal splitting cost. Based on the selected split points, the electronic device 200 splits the neural network into the subnets (i.e., the subnets of the combination B).

Figure 15:
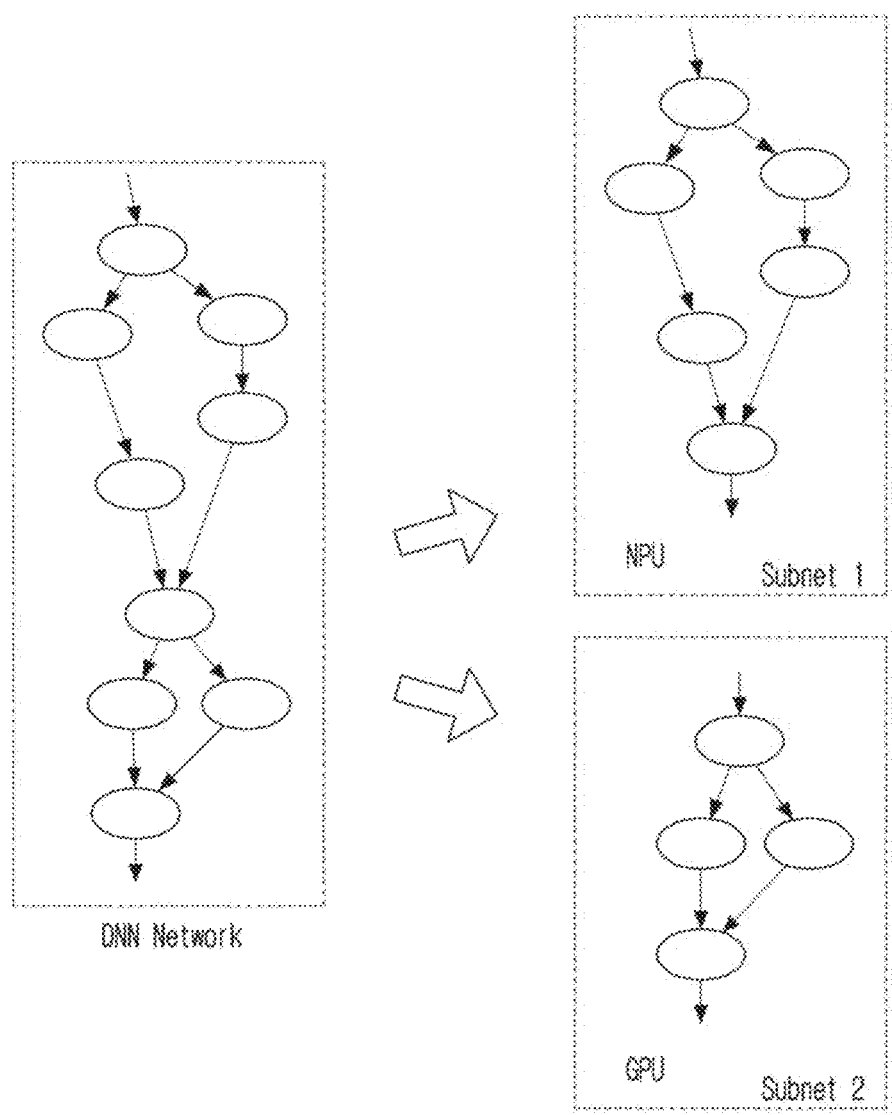
FIG. 15 is an example diagram depicting the subnets of the neural network, according to embodiments as disclosed herein.

FIG. 15 is an example diagram depicting the subnets of the neural network, according to embodiments as disclosed herein.

As depicted in FIG. 15, the electronic device 200 may split the neural network into two subnets (a subnet 1 and a subnet 2) for processing the synchronous task. The subnet 1 may include six layers and the subnet 2 may include 4 layers. The electronic device 200 allocates the processors 202a-202n for the subnet 1 and the subnet 2 based on the profiles of the processors 202a-202n and the current parameters of the processors 202a-202n. In an example herein, the electronic device 200 allocates the NPU for the subnet 1 and the GPU for the subnet 2.

Figure 16B:
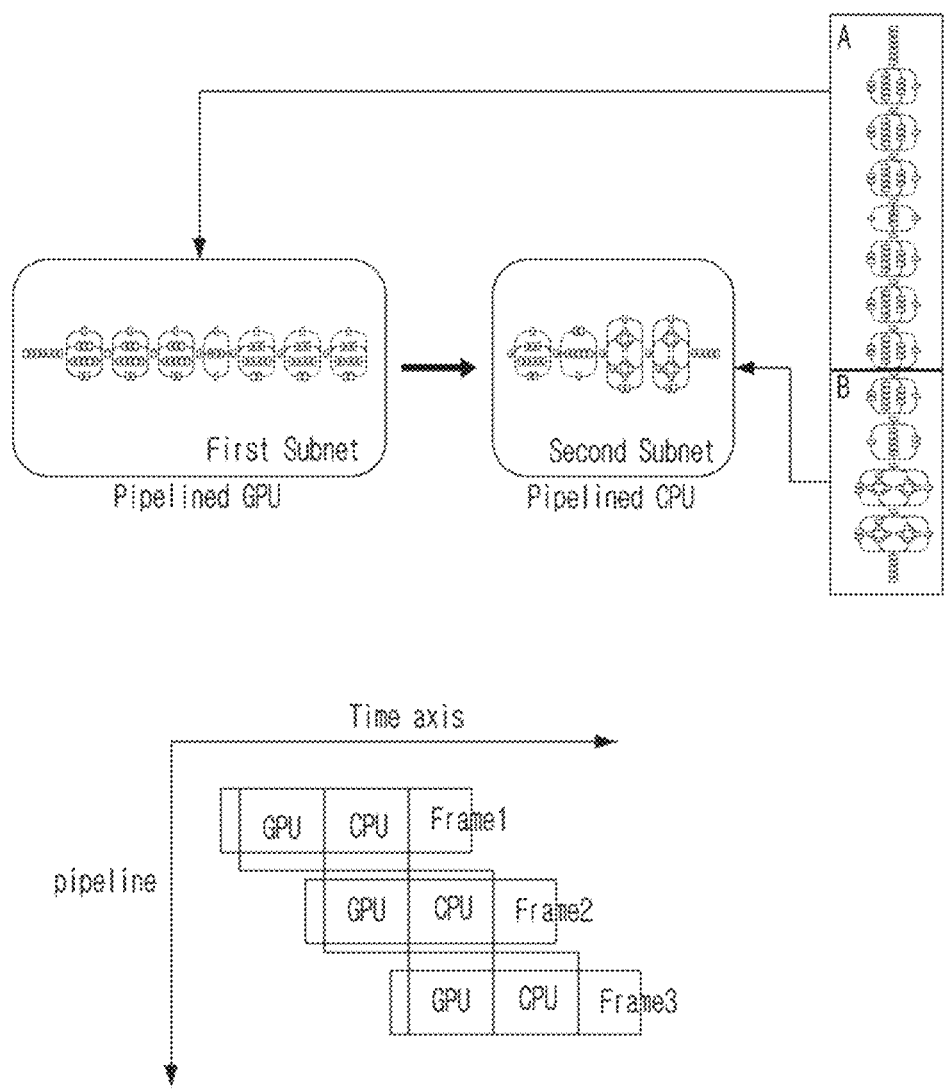

FIGS. 16A and 16B are example diagrams depicting the pipelining processing of the subnets of the neural network to perform the synchronous task on the received one or more inputs, according to embodiments as disclosed herein.

Consider an example scenario as depicted in FIG. 16A, wherein the electronic device 200 receives a request from the user for performing the synchronous task on three input frames (a frame 1, a frame 2, and a frame 3). In such a scenario, the electronic device 200 fetches the unified neural network profile from the memory 210 and extracts the profiles of the processors 202a-202n with respect to the metadata of the neural network. The electronic device 200 uses the extracted profiles and the metadata and generates the plurality of combinations of the subnets. The electronic device 200 further selects the combination of the subnets from the plurality of combinations of the subnets, which has been associated with the combination of the split points having the minimal splitting cost. In an example herein, consider that the selected combination includes three subnets (a SN1, a SN2 and a SN3). The electronic device 200 further allocates the processors 202a-202n for processing each subnet based on the profiles of the processors 202a-202n and the current parameters of the processors 202a-202n. In an example herein, the electronic device 200 allocates the processors 202a-202n such as the CPU, the GPU and the DSP for processing the SN1, the SN2, and the SN3 respectively, for each of the three input frames in the pipelining method. Thus, the three subnets may be processed in parallel at different processors.

As depicted in FIG. 16A, in a first cycle of the pipelining processing, the electronic device 200 processes the SN1 on the CPU for the frame 1.

In a second cycle of the pipelining processing, the electronic device 200 processes the SN2 on the GPU for the frame 1, once the processing of the SN1 is completed on the CPU for the frame 1. At the same time, the electronic device 200 initiates processing of the SN1 on the CPU for the frame 2.

In a third cycle of the pipelining processing, the electronic device 200 processes the SN3 on the DSP for the frame 1 once the processing of the SN2 is completed on the GPU for the frame 1. At the same time, the electronic device 200 processes the SN 2 on the GPU for the frame 2 and the SN 1 on the CPU for the frame 3 in parallel.

In a fourth cycle of the pipelining processing, the electronic device 200 processes the SN2 on the GPU for the frame 3 and the SN3 on the DSP for the frame 2 in parallel.

In a fifth cycle of the pipelining processing, the electronic device 200 processes the SN3 on the DSP for the frame 3.

Thus, better throughput and processing outputs/results may be obtained from the pipelining processing.

Consider another example scenario as depicted in FIG. 16B, wherein the electronic device 200 selects the combination of the subnets including two subnets (a SN1 and a SN2) for performing the synchronous task on three inputs frames (a frame 1, a frame 2, and a frame 3). In such a case, the electronic device 200 allocates the GPU and the CPU to process the SN1 and the SN2 respectively in the pipelining method.

The CPU initiates processing of the SN1 first for the frame 1. The GPU initiates processing of the SN2 for the frame 1, on completion of processing the SN1 by the CPU for the frame 1.

The CPU initiates processing of the SN1, on completion of processing the SN1 for the frame 1 (i.e., before completion of processing the SN2 for the frame 1). The GPU initiates processing of the SN2, on completion of processing the SN2 by the CPU for the frame 2.

The CPU initiates processing of the SN1, on completion of processing of the SN1 for the frame 3 (i.e., before completion of processing the SN2 for the frame 2). The GPU initiates processing of the SN2, on completion of processing the SN2 by the CPU for the frame 3.

Figure 17:
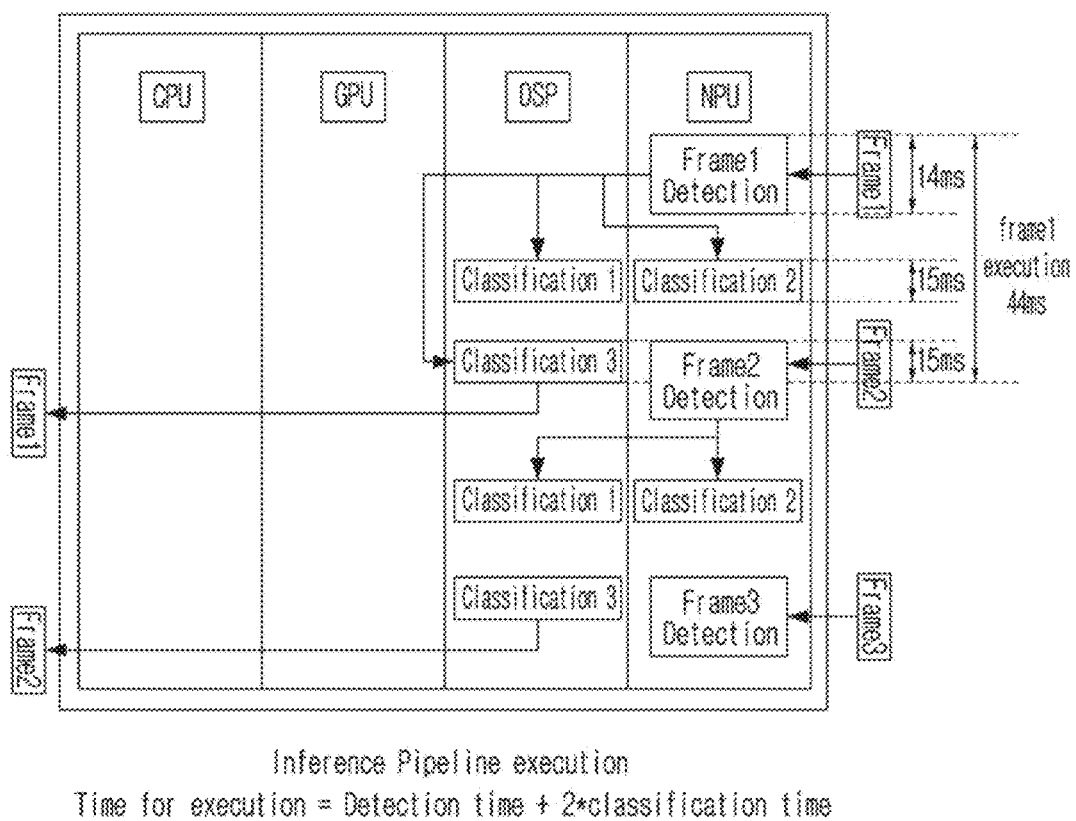
FIG. 17 is an example diagram depicting the pipelining processing of the neural network for performing example tasks of object detection and object classification on the one or more inputs, according to embodiments as disclosed herein.

FIG. 17 is an example diagram depicting the pipelining processing of the neural network for performing example tasks of object detection and object classification on the one or more inputs, according to embodiments as disclosed herein.

Consider an example scenario, wherein the electronic device 200 receives a request from the user to perform example tasks of object detection and object classification on image frames being captured from a camera application of the neural network. The object detection involves detecting three regions of interest (as an example) from each image frame. The object classification involves classifying the detected three regions into one of the classification types separately. The electronic device 200 may include the processors 202a-202n such as the CPU, the GPU, the NPU, and the DSP for processing the neural network to perform the object detection and the object classification. In such a scenario, the electronic device 200 classifies the requested task as the synchronous task, as the object classification depends on an output of the object detection. As the requested task is the synchronous task, the electronic device 200 allocates the processors 202a-202n to perform the requested task in the pipelining structure based on the unified neural network profile stored in the memory 210. For example, the electronic device 200 allocates the NPU for performing the object detection on the input frames to detect the three regions of interest (a first region, a second region, and a third region) from the input frames and for classifying the second region. The electronic device 200 allocates the DSP to classify the first region and the third region.

Upon receiving the input image frame (a frame 1) from the camera application, the electronic device 200 enables the NPU to process the neural network for detecting the three regions of interest from the frame 1. On detecting the three regions from the frame 1, the electronic device 200 enables the DSP and the NPU to process the neural network in parallel for classifying the first region and the second region of the frame 1 respectively.

The electronic device 200 further enables the DSP and the NPU to process the neural network for classifying the third region of the frame 1 and detecting the three regions of interest from a frame 2. On detecting the three regions from the frame 2, the electronic device 200 enables the DSP and the NPU to process the neural network in parallel for classifying the first region and the second region of the frame 2 respectively.

The electronic device 200 further enables the DSP and the NPU to process the neural network in parallel for classifying the third region of the frame 2 and detecting the three regions of interest from a frame 3 respectively. Similar operations may be performed for classifying the other regions of the frame 3 and for other input images being captured from the camera application of the neural network.

Figure 18A:
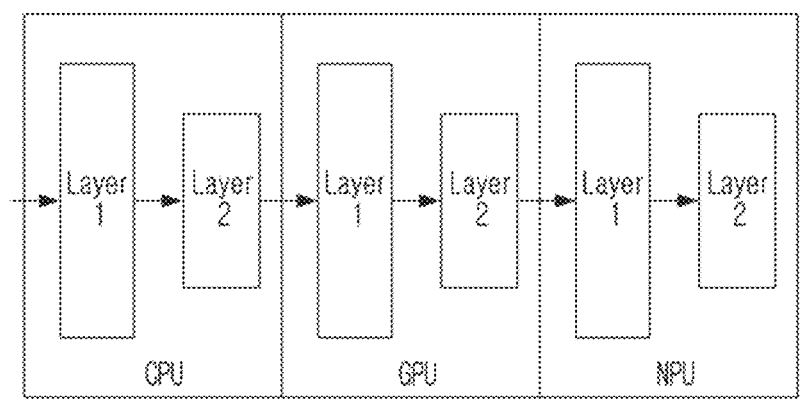
FIGS. 18A, 18B, and 18C are example diagrams depicting the pipelining processing of the neural network for performing an example synchronous task of applying a filter on the one or more inputs, according to embodiments as disclosed herein.
Figure 18A:
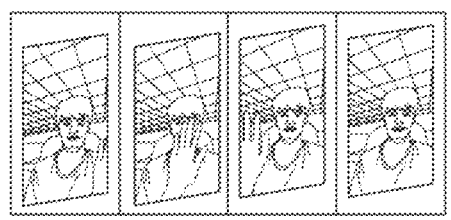
Figure 18A:
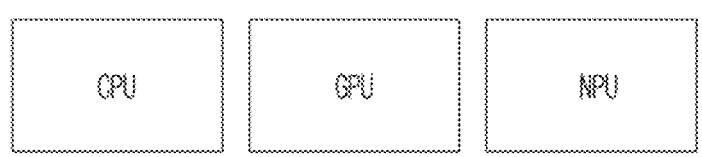
Figure 18B:
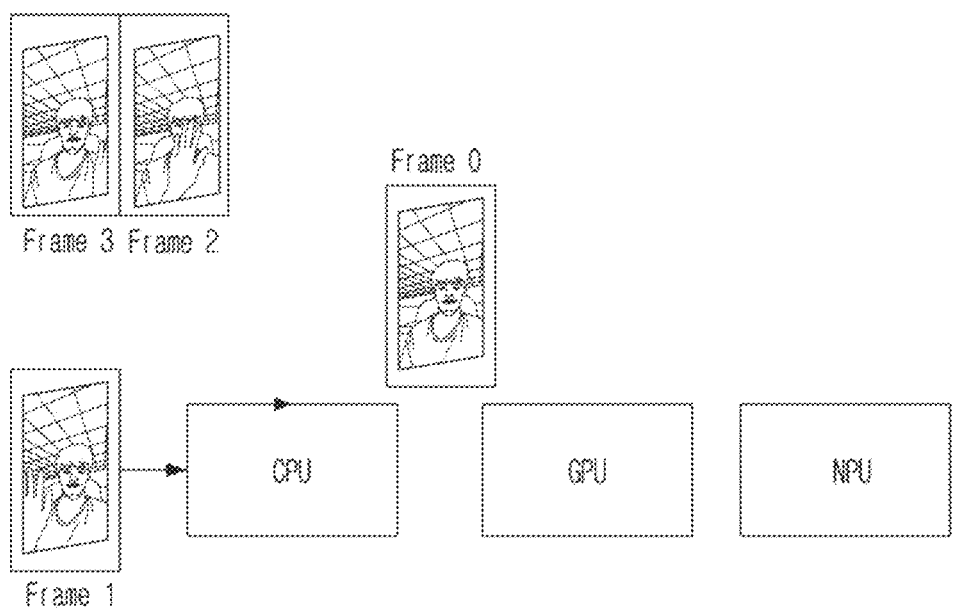
Figure 18C:
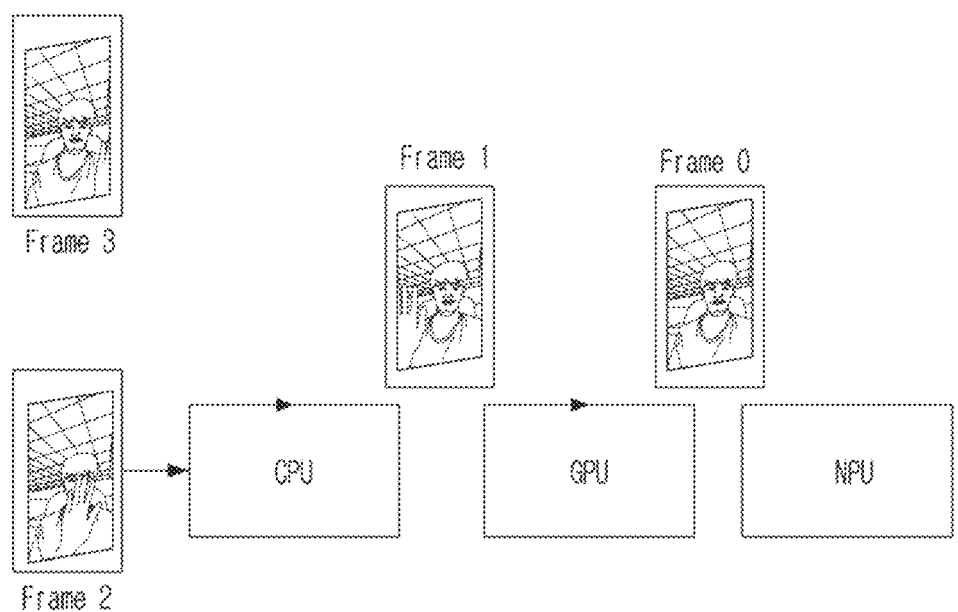

FIGS. 18A, 18B, and 18C are example diagrams depicting the pipelining processing of the neural network for performing the synchronous task on the one or more inputs, according to embodiments as disclosed herein.

Consider an example scenario, wherein the electronic device 200 receives a request for performing an example task of applying a blur effect on four input video frames that are being captured from a camera application implemented within the neural network. In such a scenario, the electronic device 200 classifies the requested task as the synchronous task, as an order of output video frames that have to be generated for the received video frames depend on an order of the input video frames. Upon classifying the requested task, the electronic device 200 splits the neural network into three subnets (a SN1, a SN2, and a SN3) as an example, wherein each of the three subnets include a layer 1 and a layer 2. The electronic device 200 further allocates the CPU, the GPU, and the NPU for processing the SN1, the SN2, and the SN3 respectively for performing the requested task.

As depicted in FIG. 18A, the CPU initiates processing of the SN1 for a frame 0. On completion of processing the SN1 for the frame 0, the GPU initiates processing of the SN2 for the frame 0 and the CPU initiates processing of the SN1 for the frame 1 at the same time, as depicted in FIG. 18B.

On completion of processing the SN2 by the GPU for the frame 0, at the same time the NPU initiates processing of the SN3 for the frame 0, the CPU initiates processing of the SN1 for a frame 2, and the GPU initiates processing of the SN2 for the frame 1 as depicted in FIG. 18C. Similar operations may be performed for other input frames. Thus, the three subnets may be processed in parallel across the different processors for the different input frames, which further decreases processing time of the neural network.

Figure 19:
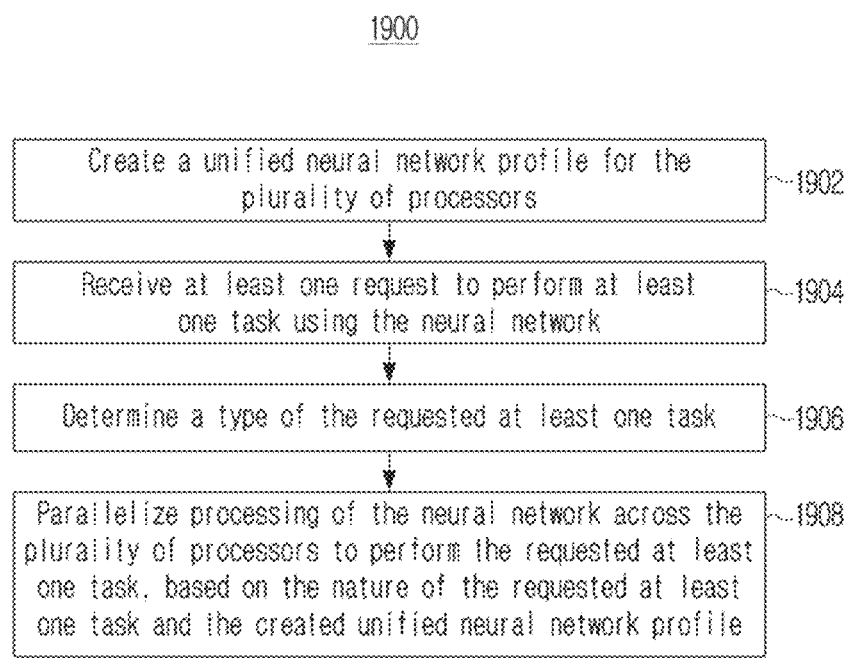
FIG. 19 is a flow diagram depicting a method for managing processing of the neural network across the heterogeneous processors, according to embodiments as disclosed herein.

FIG. 19 is a flow diagram 1900 depicting a method for managing processing of the neural network across the heterogeneous processors, according to embodiments as disclosed herein.

At step 1902, the method includes creating, by the electronic device 200, the unified neural network profile for the plurality of processors 202a-202n present in the electronic device 200. The unified neural network profile includes the metadata of the neural network with respect to the profiles of the plurality of processors 202a-202n.

At step 1904, the method includes receiving, by the electronic device 200, the at least one request to perform the at least one task on the one or more inputs using the neural network. At step 1906, the method includes determining, by the electronic device 200, the type of the requested at least one task. The electronic device 200 determines that the requested at least one task is the asynchronous task, if the order of the one or more outputs that have to be generated for the one or more inputs does not depend on the order of the at least one input. The electronic device 200 determines that the requested at least one task is the synchronous task, if the order of the one or more outputs depends on the order of the one or more inputs.

At step 1908, the method includes parallelizing, by the electronic device 200, processing of the neural network across the plurality of processors 202a-202n to perform the requested at least one task, based on the type of the requested at least one task and the created unified neural network profile.

If the requested at least one task is the asynchronous task, the electronic device 200 divides/allocates the received one or more inputs across the one or more processors 202a-202n, based on the unified neural network profile and the current parameters of each processor 202a. The electronic device 200 enables the one or more processors 202a-202n to process the neural network for the allocated one or more inputs in parallel.

If the requested at least one task is the synchronous task, the electronic device 200 generates the plurality of combinations of subnets by performing the topological sort of the neural network and the layer-wise profiling of the neural network with respect to each processor 202a-202n. The electronic device 200 calculates the splitting cost associated with each split point of each subnet of each combination. The electronic device 200 selects the split points of the combination associated with the minimal splitting cost, compared to the split points of the other combinations of subnets. The electronic device 200 selects the combination of subnets including the split points of the minimal splitting cost. The electronic device 200 allocates the processors 202a-202n to the subnets of the selected combination of subnets and enables the processors 202a-202n to process the respective subnets in the pipelining method for each of the received one or more inputs. The pipelining method involves processing of the subnets at different processors 202a-202n in parallel. The various actions, acts, blocks, steps, or the like in the method and the flow diagram 1900 may be performed in the order presented, in a different order or simultaneously. Further, in some embodiments, some of the actions, acts, blocks, steps, or the like may be omitted, added, modified, skipped, or the like.

Embodiments herein manage processing of a neural network across heterogeneous processors of an electronic device to perform one or more tasks on one or more inputs. Managing processing of the neural network across the heterogeneous processors involves offline network generation and run-time/real-time processor allocation.

The offline network generation involves creating a unified neural network profile for all the processors present in the electronic device. The unified neural network profile includes metadata of the neural network with respect to profiles of each processor. The unified neural network profile may be deployed on any processors during the run-time processor allocation, irrespective of the framework. Creation of the unified neural network profile eliminates a dependency of creating metadata of neural network for the respective frameworks and the processors.

The run-time processor allocation involves classifying the requested task into a synchronous task or an asynchronous task and allocating the processors for processing the neural network for each of the inputs based on the unified neural network profile, current parameters of the processor, and the classification of the requested task. If the requested task is the asynchronous task, the one or more processors are allocated for processing the neural network for the one or more inputs in parallel. If the requested task is the synchronous task, the one or more processors are allocated for processing subnets of the neural network in parallel for each received input in a pipelining method. The run-time processor allocation involves efficient utilization of the processors based on their profiles and current parameters, which reduces time required for processing the neural network. Examples of the current parameters may include, but not limited to, load present on each processor, resources available on each processor, a busy status of each processor, and so on.

The embodiments disclosed herein may be implemented through at least one software program running on at least one hardware device and performing network management functions to control the elements. The elements shown in FIGS. 2, and 3, may be at least one of a hardware device, or a combination of hardware device and software module.

The embodiments disclosed herein describe methods and systems for managing processing of neural network across heterogeneous processors. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiments may be implemented on different hardware devices, e.g. using a plurality of CPUs.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for configuring a neural network across a plurality of processors, the method comprising:
   creating a unified neural network profile for the plurality of processors;
   receiving at least one request to perform a task using the neural network;
   determining a type of the task as an asynchronous task based on an output order of output data of the task being dependent on an input order of the task, and determining the type of the task as a synchronous task based on the output order of the output data of the task being independent of the input order of the input data of the task; and
   parallelizing processing of the neural network across the plurality of processors to perform the task, based on the type of the task and the created unified neural network profile, wherein the parallelizing processing comprises:
   based on the task corresponding to the synchronous task, configuring the neural network into a pipelining structure by identifying a plurality of split points of the neural network based on topological sort and layer-wise profiling of the neural network, and splitting the neural network into a plurality of combinations of subjects, each comprising one or more layers; and based on the task corresponding to the asynchronous task, configuring the neural network into a parallel structure, by allocating the plurality of processors to process a plurality of layers of the neural network in parallel, according to the unified neural network profile.

2. The method of claim 1, wherein the creating the unified neural network profile comprises:

extracting metadata of the neural network, wherein the metadata of the neural network indicates a number of layers for the task and parameters of the layers, wherein the layers comprise a first layer, and the parameters of the first layer comprise at least one of, a type of the first layer, weights of the first layer, a data type supported for processing the weights of the first layer, and inputs and outputs of the first layer;

determining individual profiles of the plurality of processors, wherein the plurality of processors comprise a first processor, the individual profiles of the plurality of processors comprises a first profile of the first processor, the first profile of the first processor comprises the data type supported by the first processor, a time required by the first processor to process each layer of the neural network, and overheads comprising either one or both of a data type conversion overhead and a data copy overhead; and creating a data set as the unified neural network profile by mapping the individual profiles of the plurality of processors with the layers of the neural network and the parameters of the layers.

3. The method of claim 2, wherein the data type corresponds to one of an integer data type and a float data type;

the data type conversion overhead comprises a time required for a conversion of the data type of at least one output of the first processor into a data type supported by a second processor of the plurality of processors, wherein the at least one output of the first processor is provided to the second processor; and the data copy overhead comprises a time required for copying the at least one output of the first processor to the second processor.

4. The method of claim 1, wherein the configuring the neural network into the parallel structure comprises:

determining parameters of each processor of the plurality of processors at a current instance of time, wherein the parameters of each processor comprise at least one of load on each processor, resources available on each processor, and a busy status of each processor;

extracting an individual profile of each processor with respect to metadata of the neural network for the task from the unified neural network profile;

allocating at least one processor, among the plurality of processors, for at least one input of the task based on the determined parameters of each processor, and the individual profile of each processor with respect to the metadata of the neural network for the task;

providing the unified neural network profile and the at least one input to the allocated at least one processor; and configuring the neural network on the allocated at least one processor in parallel for each of the at least one input.

5. The method of claim 4, wherein the at least one processor comprises a plurality of different processors allocated for each of the at least one input.

6. The method of claim 1, further comprising:

generating a plurality of combinations of subnetworks from the neural network, wherein each of the plurality of combinations of subnetworks comprises a plurality of subnetworks;

selecting one of the plurality of combinations of subnetworks; and allocating different processors for the plurality of subnetworks included in the selected one of the plurality of combinations of subnetworks to process the task in parallel through the different processors.

7. The method of claim 6, wherein the generating the plurality of combinations of subnetworks comprises:

performing the topological sort on the neural network;

performing the layer-wise profiling of the neural network with respect to the plurality of processors; and generating the plurality of combinations of subnetworks based on the performed topological sort and the layer-wise profiling of the neural network, wherein the plurality of subnetworks of each of the plurality of combinations of subnetworks is generated using the plurality of split points.

8. The method of claim 7, wherein the performing the topological sort comprises analyzing a topology of the neural network to determine whether layers of the neural network are connected in series or in parallel.

9. The method of claim 7, wherein the performing the layer-wise profiling comprises:

identifying individual profiles of the plurality of processors mapped with respect to layers of the neural network and associated parameters of the layers, from the unified neural network profile; and determining a time required by the plurality of processors to process the layers of the neural network using the identified individual profiles of the plurality of processors.

10. The method of claim 6, wherein the selecting the one of the plurality of combinations of subnetworks comprises:

assigning the different processors for processing the plurality of subnetworks of each of the plurality of combinations of subnetworks, based on the layer-wise profiling of the neural network;

recording processing times consumed by the different processors for processing the plurality of subnetworks of each of the plurality of combinations of subnetworks;

recording a data copy overhead incurred for each of the plurality of combinations of subnetworks;

calculating a splitting cost of the plurality of split points associated with each of the plurality of combinations of subnetworks based on the recorded processing time and the recorded data copy overhead, wherein the splitting cost is a measure of difference between the processing times and the data copy overhead;

determining, among the plurality of split points, a combination of split points that is associated with a minimal splitting cost compared to other split points of the plurality of split points; and selecting the one of the plurality of combinations of subnetworks from the plurality of combinations of subnetworks associated with the determined combination of split points.

11. The method of claim 10, wherein among the plurality of processors, a fastest and available processor of the plurality of processors is assigned to a subnetwork of the plurality of subnetworks that has a greatest number of layers compared to other subnets, and a slowest processor of the plurality of processors is assigned to another subnetwork of the plurality of subnetworks that has a least number of layers compared to other subnetworks.

12. An electronic device comprising:
a memory;
a plurality of processors; and
a controller coupled to the plurality of processors and the memory, and configured to:
create a unified neural network profile for the plurality of processors;
receive at least one request to perform a task using a neural network;
determine a type of the task as an asynchronous task based on an output order of output data of the task being dependent on an input order of the task, and determine the type of the task as a synchronous task based on the output order of the output data of the task being independent of the input order of the input data of the task;
based on the task corresponding to the synchronous task, configure the neural network into a pipelining structure by identifying a plurality of split points of the neural network based on topological sort and layer-wise profiling of the neural network, and splitting the neural network into a plurality of combinations of subjects, each comprising one or more layers; and
based on the task corresponding to the asynchronous task, configure the neural network into a parallel structure, by allocating the plurality of processors to process a plurality of layers of the neural network in parallel, according to the unified neural network profile.

13. The electronic device of claim 12, wherein the controller is further configured to:
extract metadata of the neural network, wherein the metadata of the neural network indicates a number of layers for the task and parameters of the layers, wherein the layers comprise a first layer, and the parameters of the first layer comprise at least one of, a type of the first layer, weights of the first layer, a data type supported for processing the weights of the first layer, and inputs and outputs of the first layer;
determine individual profiles of the plurality of processors, wherein the plurality of processors comprise a first processor, the individual profiles of the plurality of processors comprises a first profile of the first processor, the first profile of the first processor comprises the data type supported by the first processor, a time required by the first processor to process each layer of the neural network, and overheads comprising at least one of a data type conversion overhead and a data copy overhead; and
create a data set, the unified neural network profile, by mapping the individual profiles of the plurality of processors with the layers of the neural network and the parameters of the layers.

14. The electronic device of claim 13, wherein
the data type corresponds to one of an integer data type, and a float data type;
the data type conversion overhead comprises a time required for a conversion of the data type of at least one output of the first processor into a data type supported by a second processor of the plurality of processors, wherein the at least one output of the first processor is provided to the second processor; and
the data copy overhead comprises a time required for copying the output of the first processor to the second processor.

* * * * *